Figure 1:
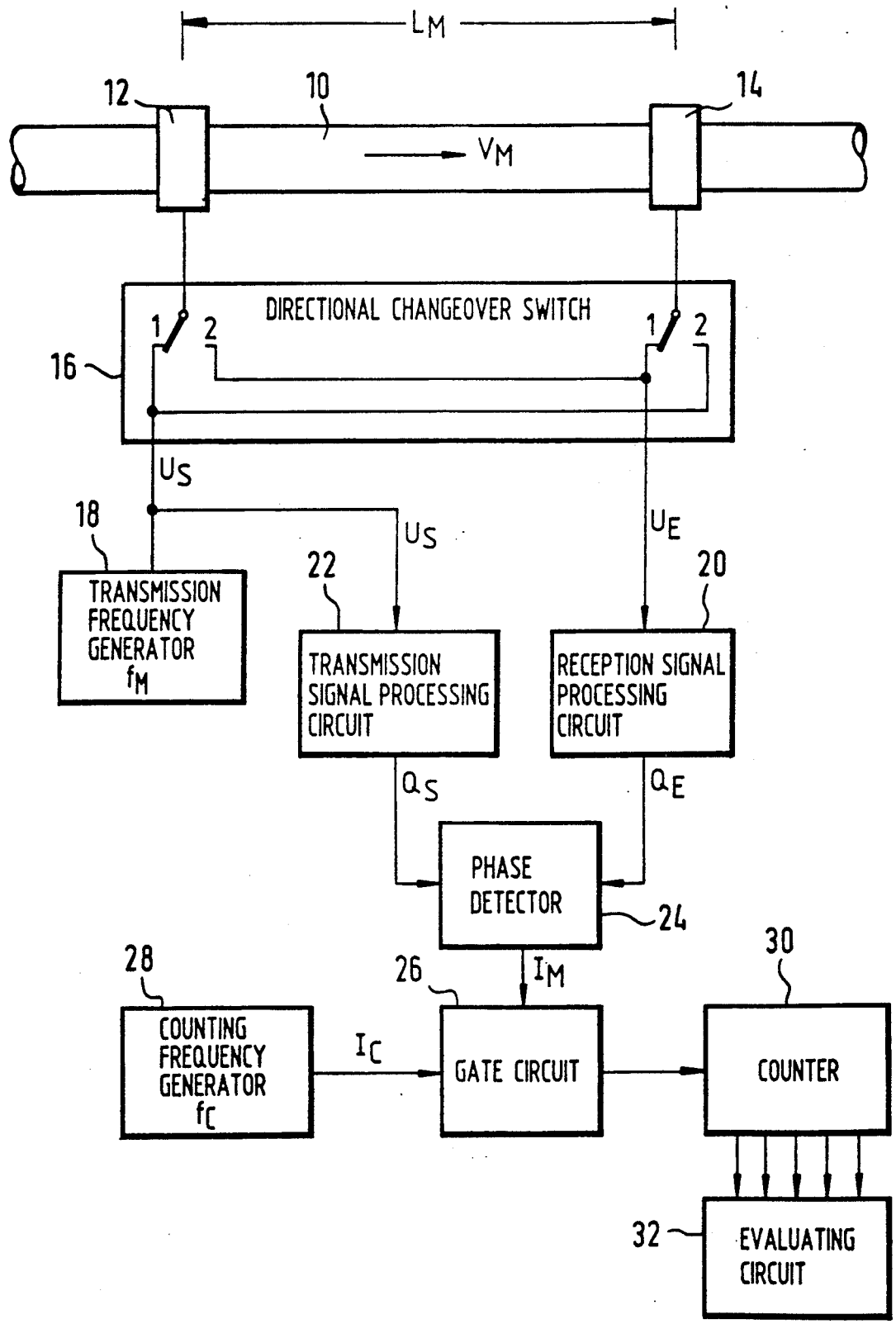

United States Patent [19]

Lang et al.

[11] Patent Number: 5,052,230
[45] Date of Patent: Oct. 1, 1991

[54] METHOD AND ARRANGEMENT FOR FLOW RATE MEASUREMENT BY MEANS OF ULTRASONIC WAVES

[75] Inventors: Michael Lang, Weil-Haltingen, Fed. Rep. of Germany; Michael Steinacher, Basel, Switzerland

[73] Assignee: Flowtec AG, Switzerland

[21] Appl. No.: 460,947

[22] PCT Filed: Jul. 6, 1989

[86] PCT No.: PCT/EP89/00775
§ 371 Date: Feb. 28, 1990
§ 102(e) Date: Feb. 28, 1990

[87] PCT Pub. No.: WO90/00723
PCT Pub. Date: Jan. 25, 1990

[30] Foreign Application Priority Data

Jul. 8, 1988 [DE] Fed. Rep. of Germany ....... 3823177
Dec. 23, 1988 [DE] Fed. Rep. of Germany ....... 3843678

[51] Int. Cl.$^5$ ............................................. G01F 1/66
[52] U.S. Cl. ................................................ 73/861.28
[58] Field of Search .............. 73/861.27, 861.28, 597; 324/83 D

[56] References Cited

U.S. PATENT DOCUMENTS 4,011,755 3/1977 Pedersen et al. .............. 73/861.28
4,164,865 8/1979 Hall et al. .
4,445,389 5/1984 Potzick et al. .
4,527,433 7/1985 Gutterman ..................... 73/861.28

FOREIGN PATENT DOCUMENTS 2099146 12/1982 United Kingdom .

Primary Examiner—Charles A. Ruehl
Attorney, Agent, or Firm—Barnes & Thornburg

[57] ABSTRACT

For flow rate measurement by means of ultrasonic waves, on a measuring tube two ultrasonic transducers are arranged spaced apart from each other, one operating as transmitting transducer and the other as receiving transducer. For determining the flow rate the phase shift between the transmission signal and the reception signal is measured digitally in that the measuring time intervals corresponding to the phase shift the periods of a signal are counted with a counting frequency which is substantially greater than the frequency of the transmission signal. The start phase which the counting frequency signal has at the beginning of each counting operation with respect to the measuring time interval is varied from measuring time interval to measuring time interval in a measuring cycle including a plurality of successive measuring time intervals and the counts obtained in the course of the measuring cycle are evaluated to form a measured value with increased measurement resolution.

50 Claims, 17 Drawing Sheets

Fig. 11
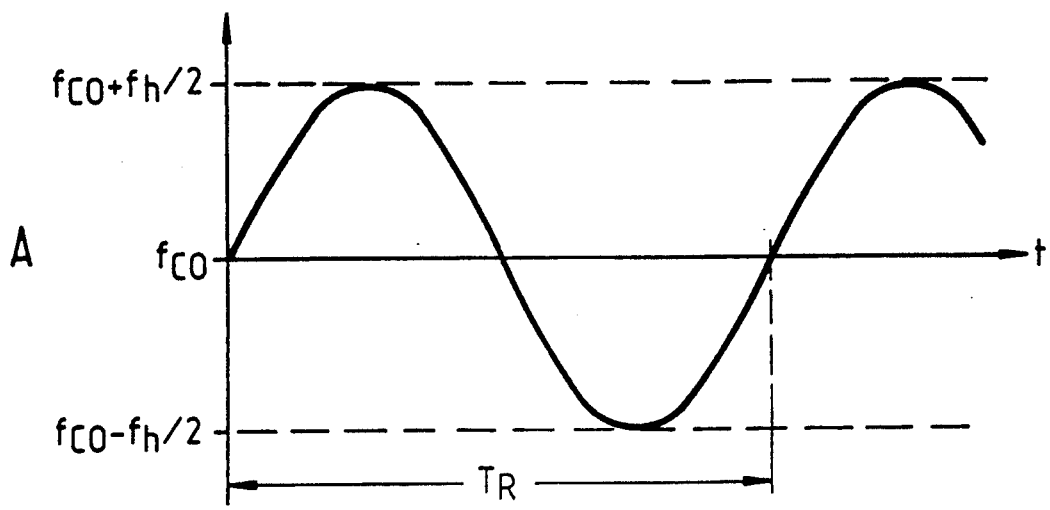
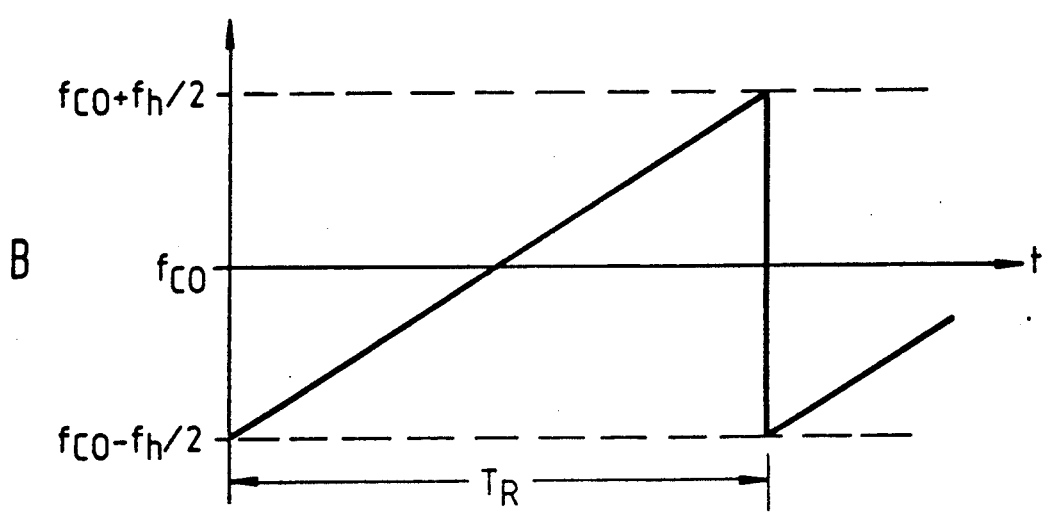
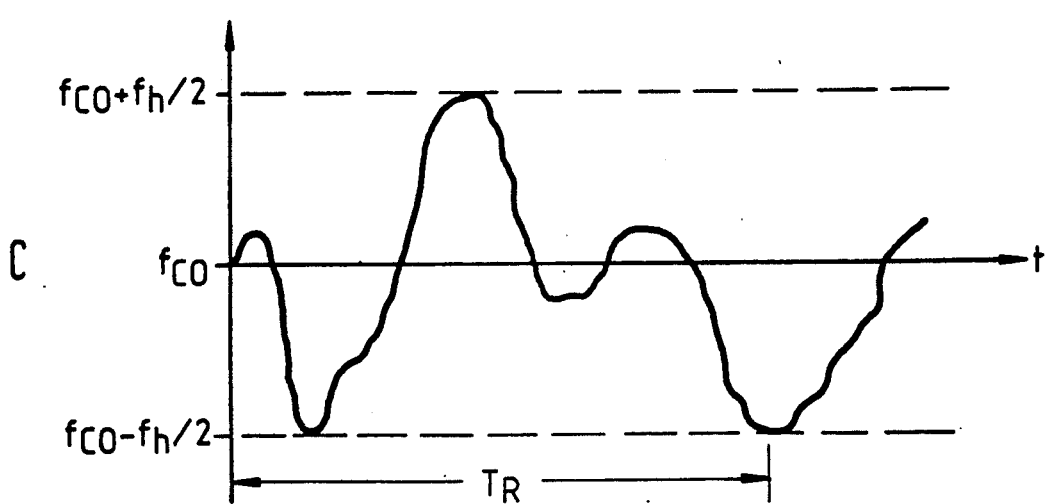

METHOD AND ARRANGEMENT FOR FLOW RATE MEASUREMENT BY MEANS OF ULTRASONIC WAVES

The invention relates to a method for flow rate measurement by means of ultrasonic waves which are propagated in a medium flowing through a measuring tube between two ultrasonic transducers which are arranged spaced apart from each other and of which the one operates as transmitting transducer converting an electrical transmission signal to an ultrasonic wave of the same frequency whilst the other operates as receiving transducer converting the incoming ultrasonic wave to an electrical reception signal of the same frequency, the phase shift between the transmission signal and reception signal being measured to determine the flow rate.

In this flow rate measuring method the flow rate to be measured is derived from the phase shift between the transmission signal and the reception signal in an ultrasonic wave propagated in one direction if the velocity of sound is known. By determining the phase shifts in an ultrasonic wave propagated in the flow direction and an ultrasonic wave propagated against the flow direction it is possible from the difference between said phase shifts to obtain a measurement result for the flow rate independent of the velocity of sound.

In a method of this type known from Swiss Patent 628,140 the phase shift between the transmission signal and the reception signal determined for each propagation direction is converted to a DC voltage which is stored in a sample and hold circuit. The two stored DC voltages are then applied to the two inputs of a differential amplifier which thus furnishes at the output a differential voltage which is proportional to the difference between the phase shifts and thus to the flow rate. In addition, by forming the sum of the stored DC voltages a voltage is obtained which is proportional to the velocity of sound in the medium. Finally, in this known method the frequency of the ultrasonic wave is regulated in dependence upon the phase shifts determined to an optimum value and the flow rate obtained from the differential voltage is corrected in dependence upon the frequency set.

This known method requires high expenditure on precise analog circuits but nevertheless is still liable to the inevitable causes of errors in any analog signal processing so that the measurement accuracy obtainable is limited. Furthermore, the output signal obtained is available in the form of an analog voltage which is not suitable directly for digital evaluation, for example by a microcomputer.

The problem underlying the invention is the provision of a flow measurement method of the type mentioned at the beginning which with relatively small circuit expenditure permits flow rate measurement with great measuring accuracy in digital manner and therefore furnishes the measurement result in the form of a digital signal.

According to the invention this is achieved in that in measuring time intervals each having a duration corresponding to the phase shift the periods of a signal having a counting frequency are counted which counting frequency is substantially higher than the measuring frequency corresponding to the frequency of the transmission signal, that the start phase which the counting frequency signal has at the beginning of each counting operation with respect to the measuring time interval is varied from measuring time interval to measuring time interval in a measuring cycle including a plurality of consecutive measuring time intervals and that the counts obtained in the course of the measuring cycle are evaluated to form a measured value with increased measurement resolution.

In the method according to the invention by counting the periods of a counting frequency during the measuring time intervals corresponding to the phase shifts the phase measurement is reduced to a digital time measurement which can conveniently and reliably be carried out with the widely used integrated digital circuits. However, there is the problem that the digital measurement has a system-inherent quantizing error which limits the resolution obtainable in the measurement because the smallest distinguishable time interval corresponds to the period duration of the counting frequency signal. Under the usual use conditions the measuring time intervals corresponding to the phase measurement are very short and must be measured with great measuring accuracy and correspondingly high resolution in particular when the difference of the phase shifts is evaluated for a flow rate measurement independent of the velocity of sound. The duration of the measuring time intervals is of the order of magnitude of microseconds and their difference is of the order of magnitude of fractions of a nanosecond. To measure such short time intervals by digital counting of counting frequency periods with a resolution adequate for the measuring accuracy required extremely high counting frequencies would be necessary and their generation and evaluation would require great technical expenditure.

In the method according to the invention a resolution improved with respect to the counting frequency is obtained by additionally varying the start phase in successive measuring time intervals. The result of this step is that the number of counting frequency periods counted in the course of a measuring time interval varies during the measuring cycle; whereas for a number of measuring time intervals k counting frequency periods are counted for the remaining number of the measuring time intervals k+1 counting frequency periods are counted. The ratio of these numbers provides more accurate information on the actual duration of the measuring time intervals and accordingly permits an increase of the resolution beyond the quantizing step corresponding to a counting frequency period. This increase in the resolution is the greater the greater the number of measuring time intervals evaluated in a measuring cycle to form a measured value but of course the measuring time necessary for recovering a measured value increases to the same extent. However, generally the necessary measuring times are so short that their duration is of no significance compared with the advantage of the increased resolution.

Preferred embodiments and further developments of the method according to the invention and an arrangement for carrying out the method are characterized in the subsidiary claims. These embodiments and further developments relate in particular also to steps for determining the number of the whole wavelengths on the measurement distance and a construction of the ultrasonic transducers particularly well suited to carrying out the method according to the invention.

Figure 2:
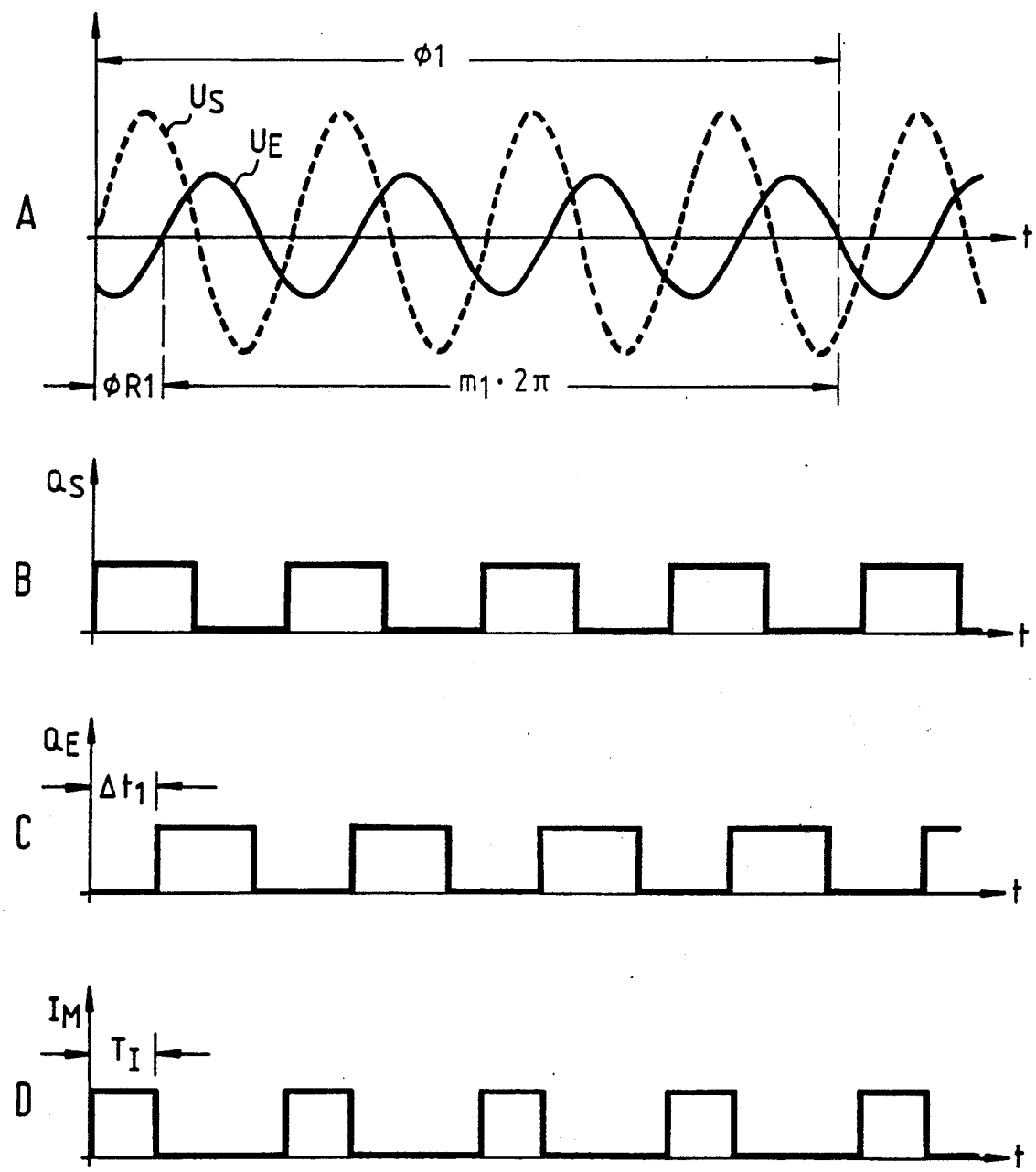
Figure 3:
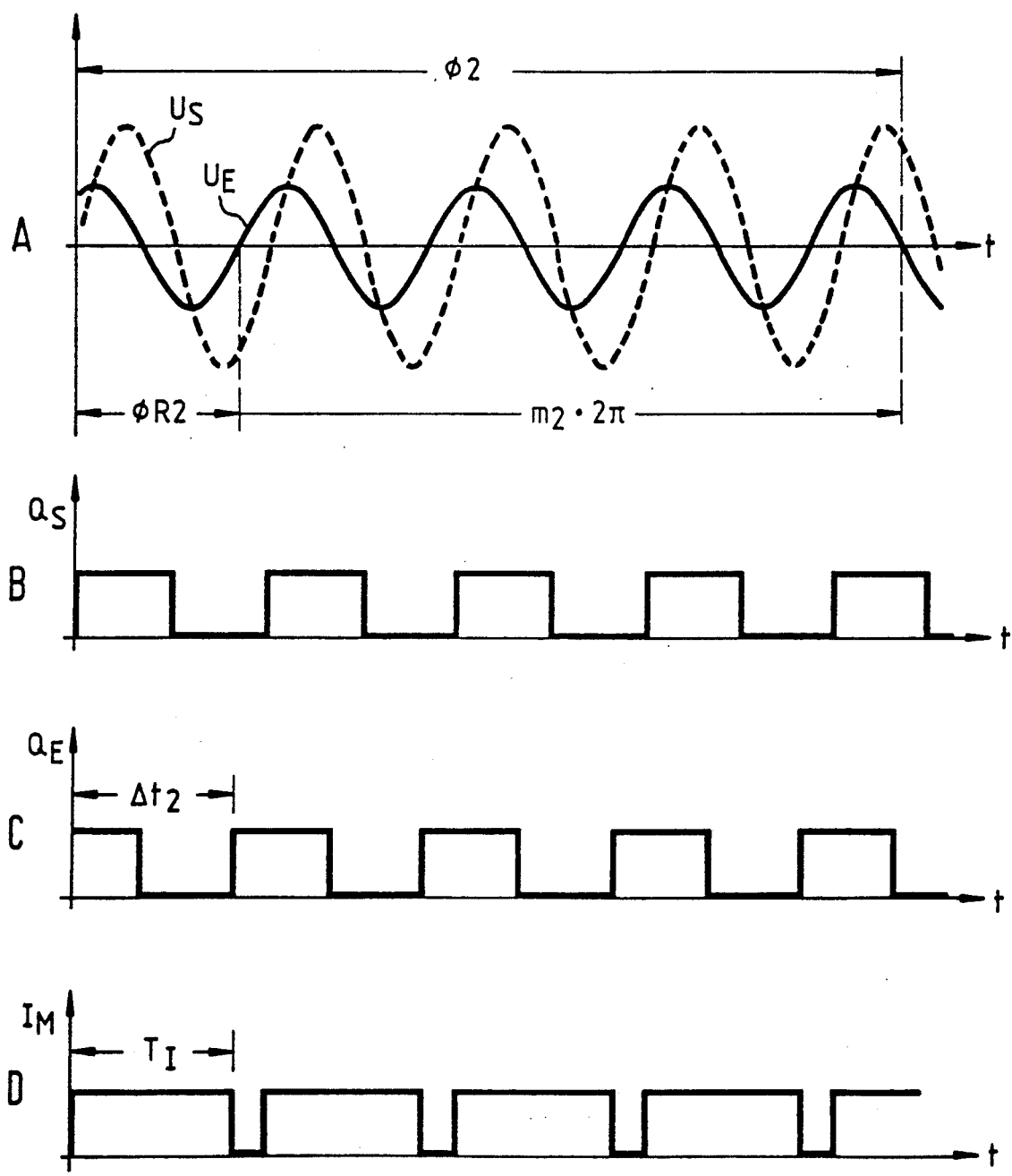
Figure 4:
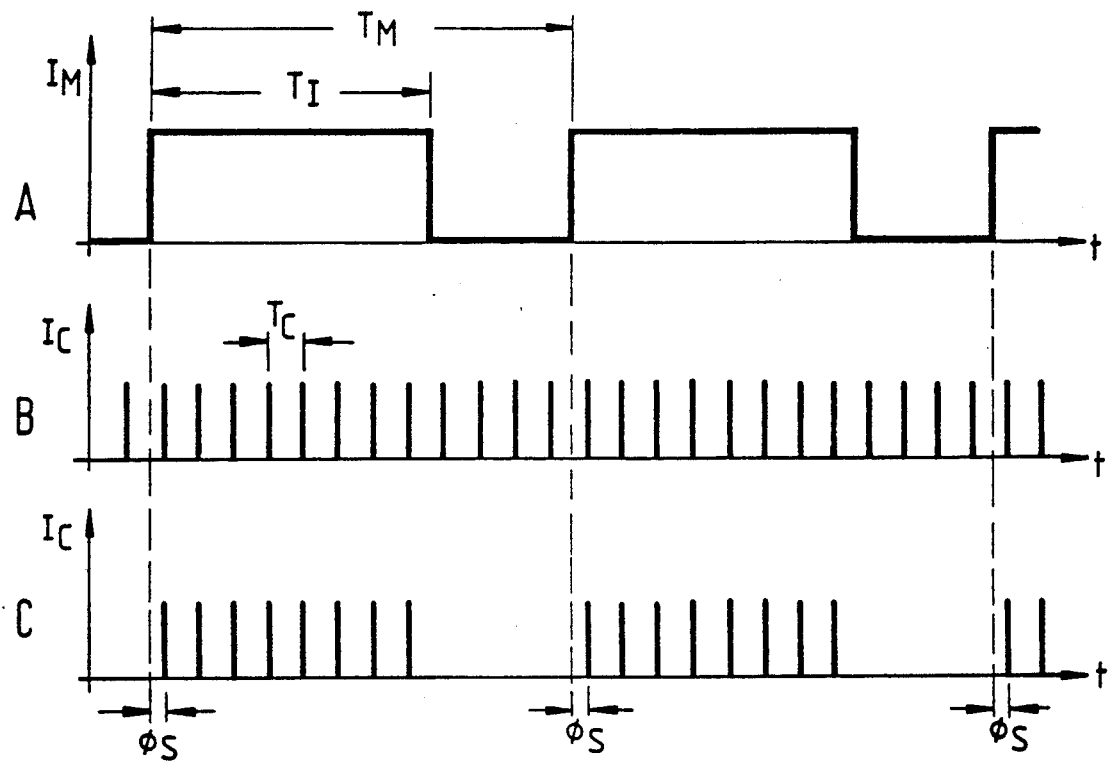
Figure 6:
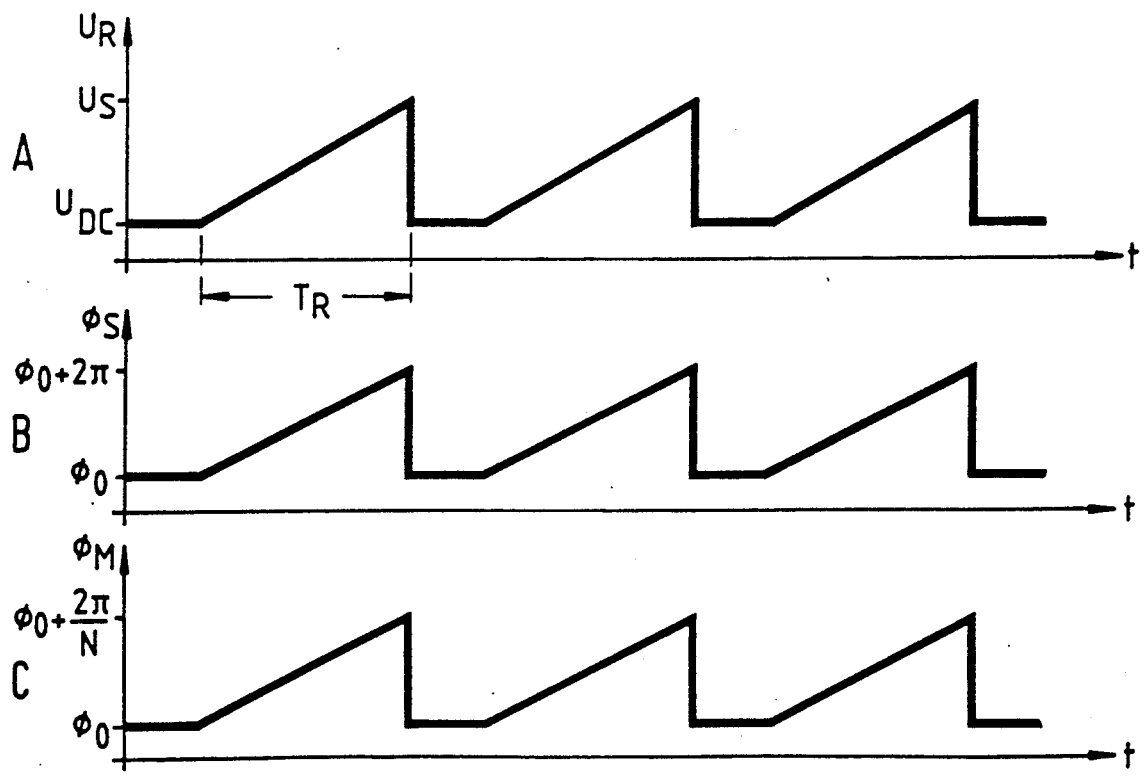
Figure 5:
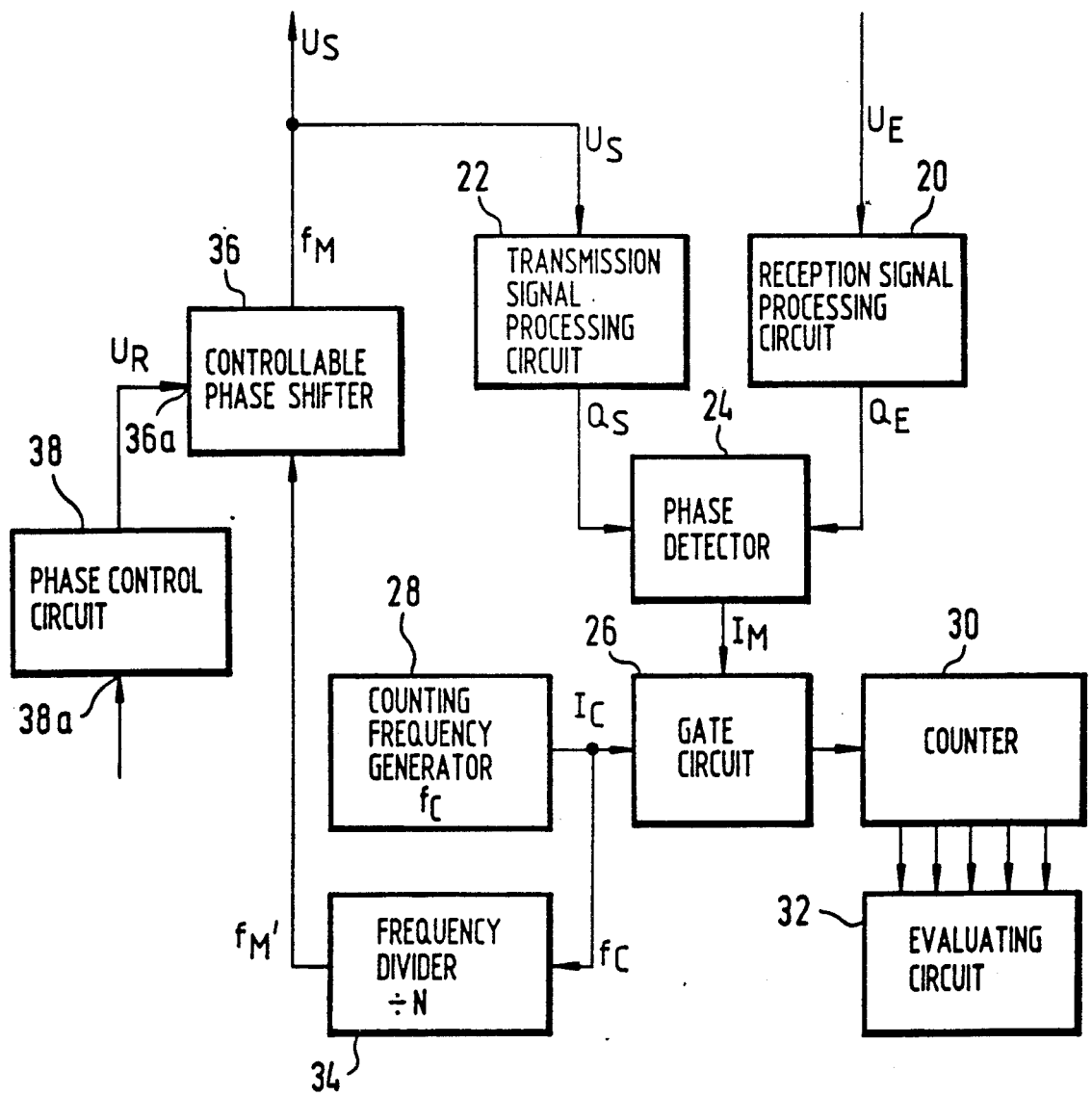
Figure 7:
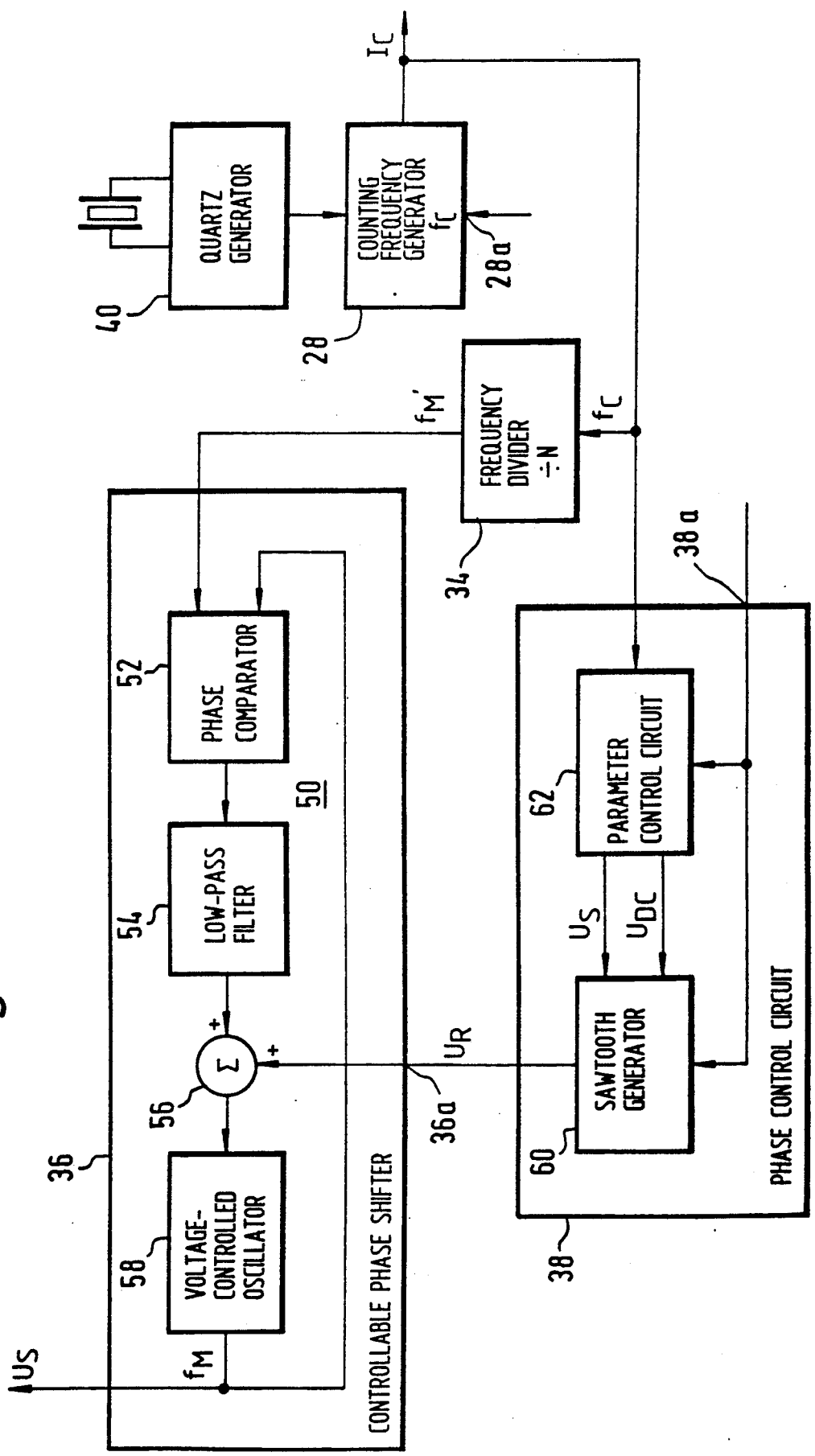
Figure 8:
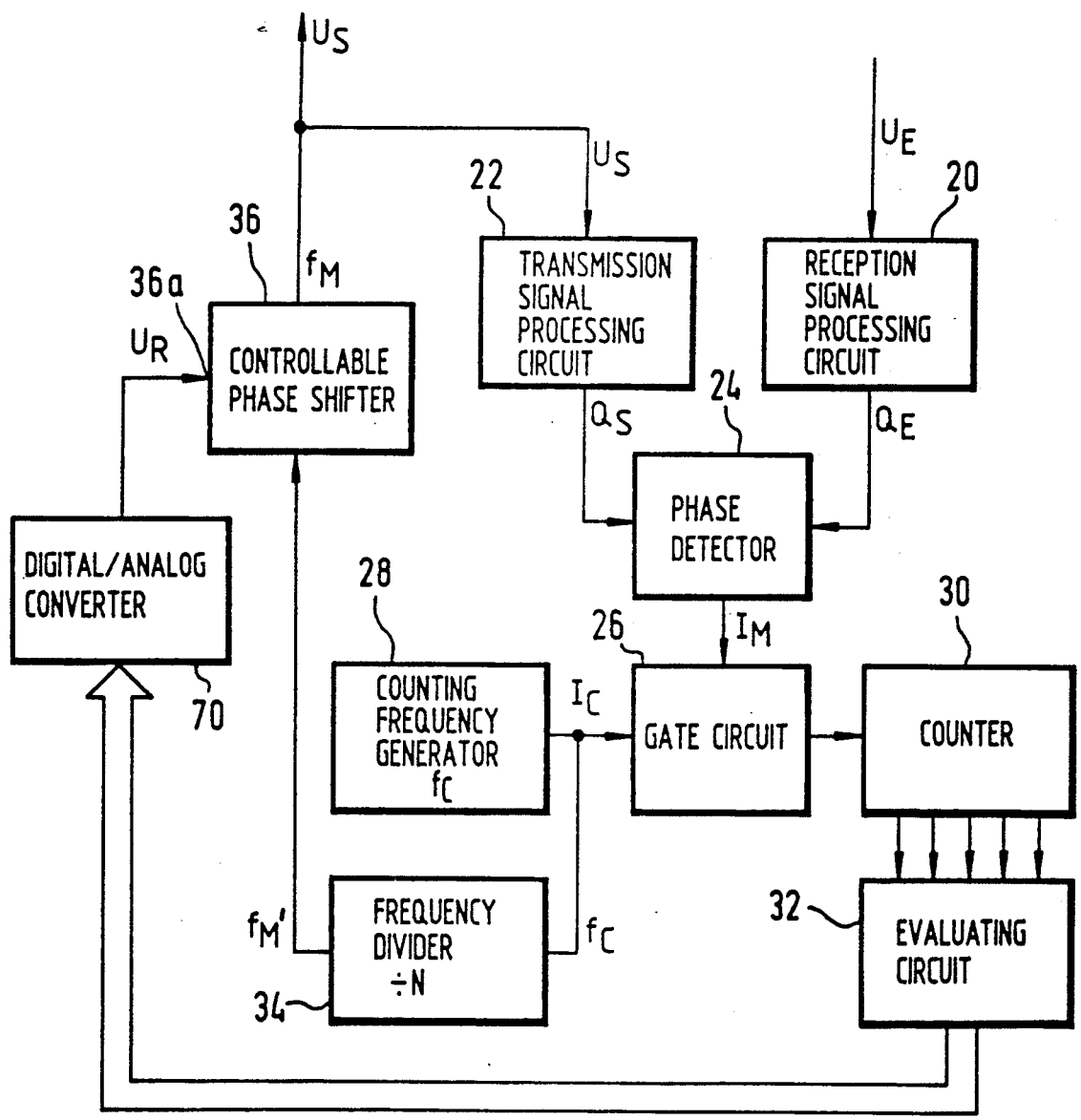
Figure 9:
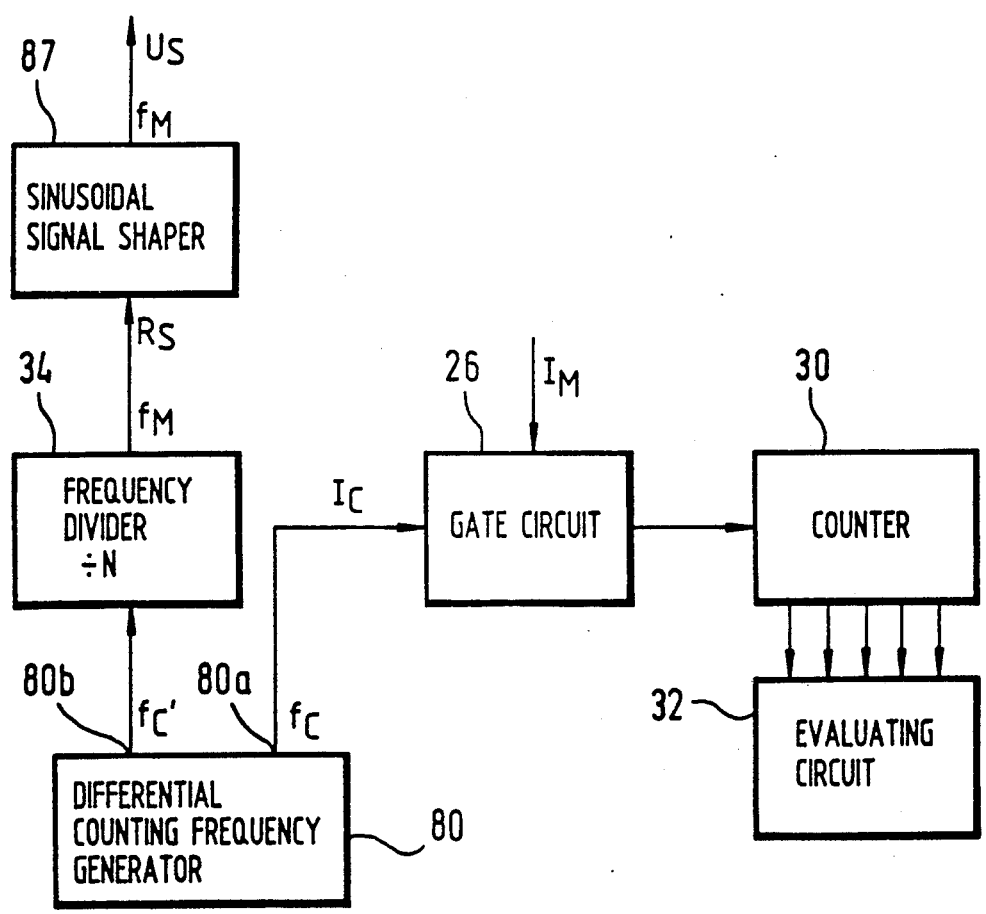
Figure 10:
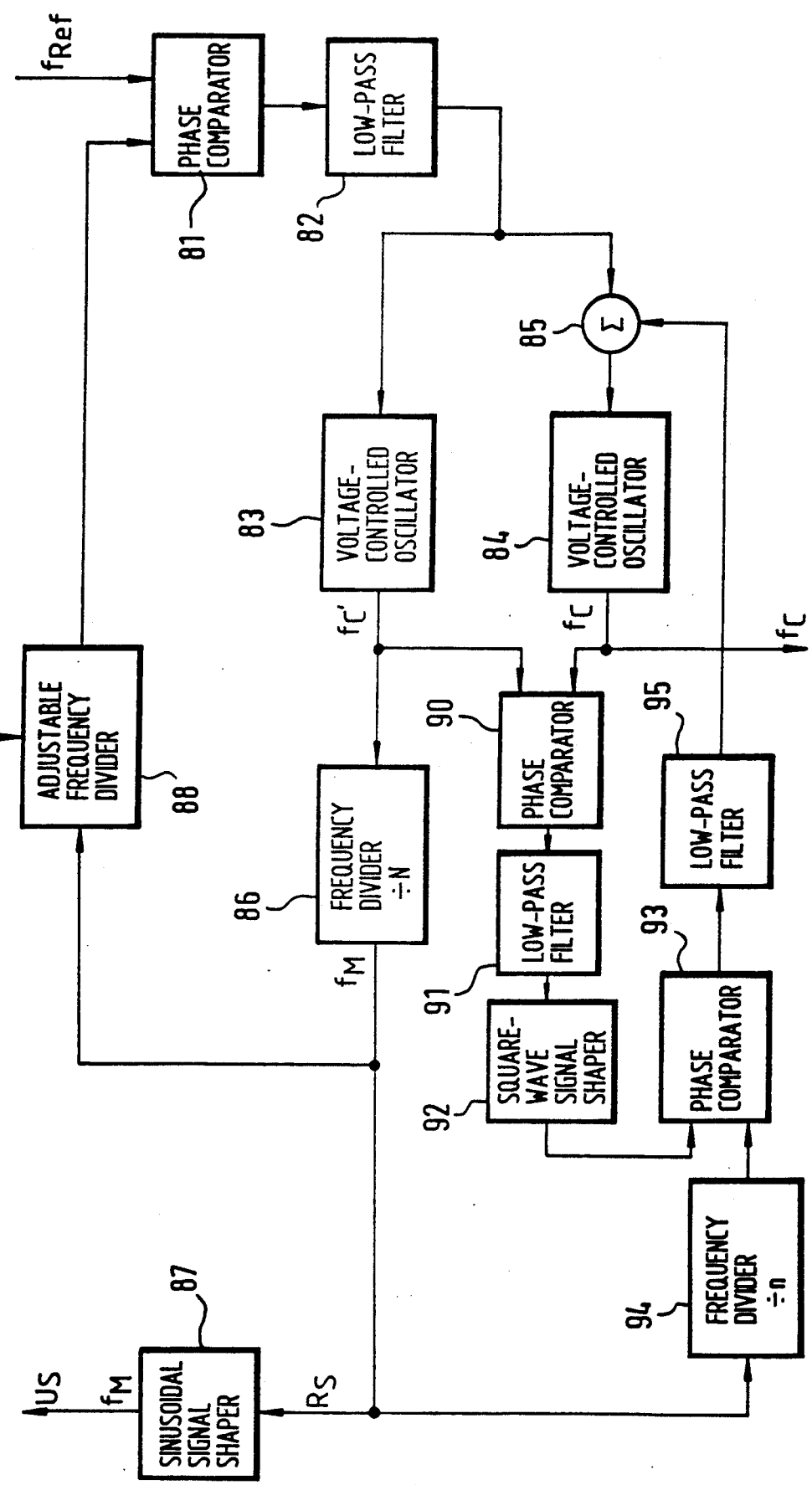
Figure 12:
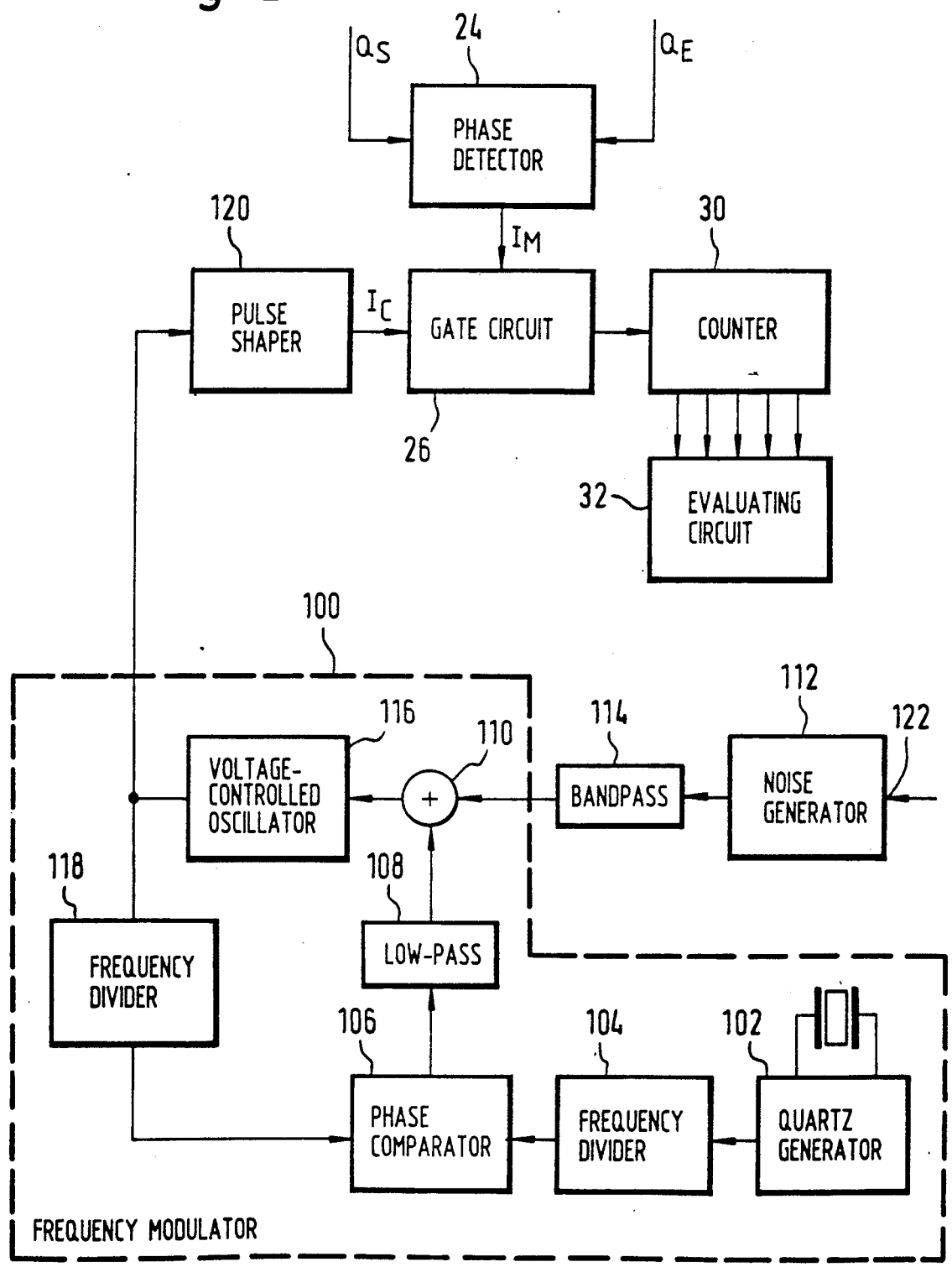
Figure 13:
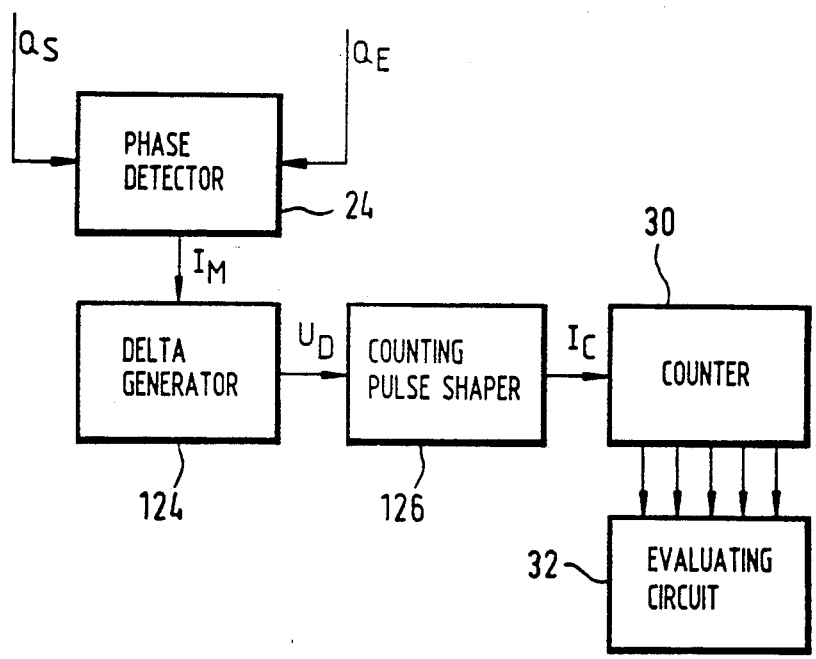
Figure 14:
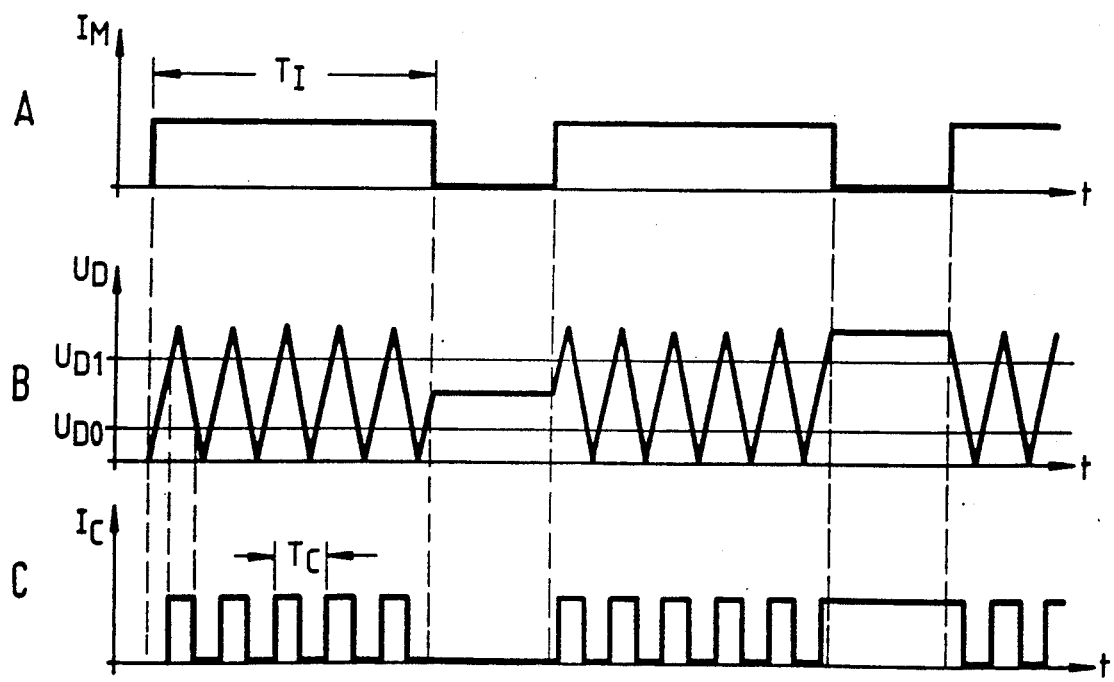
Figure 15:
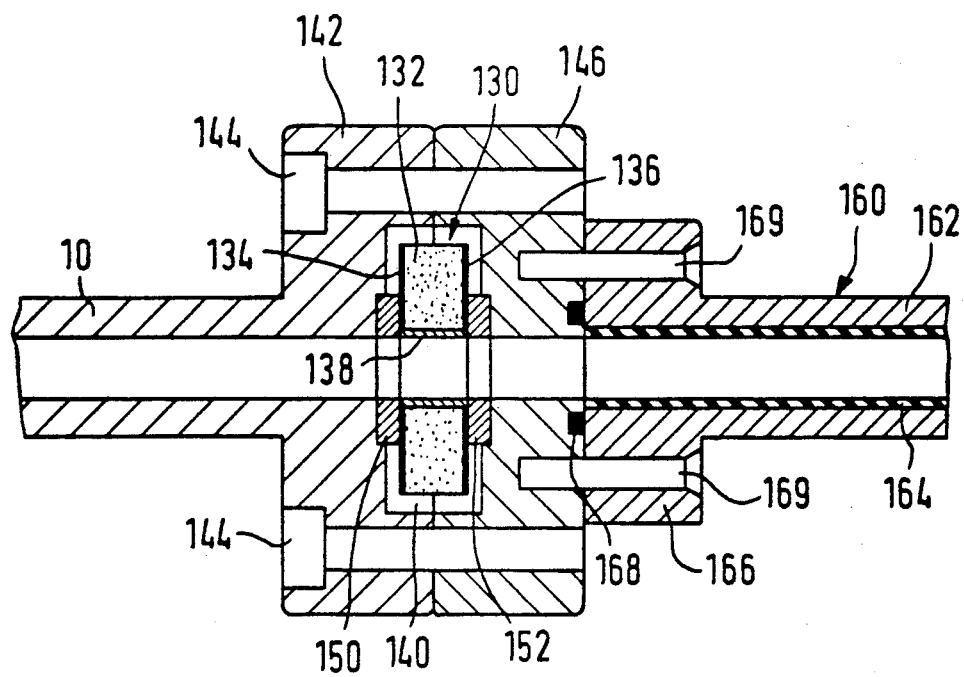
Figure 16:
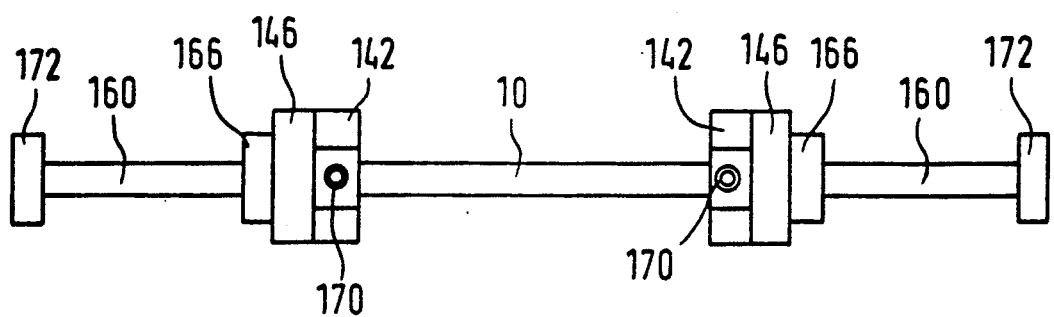
Figure 17:
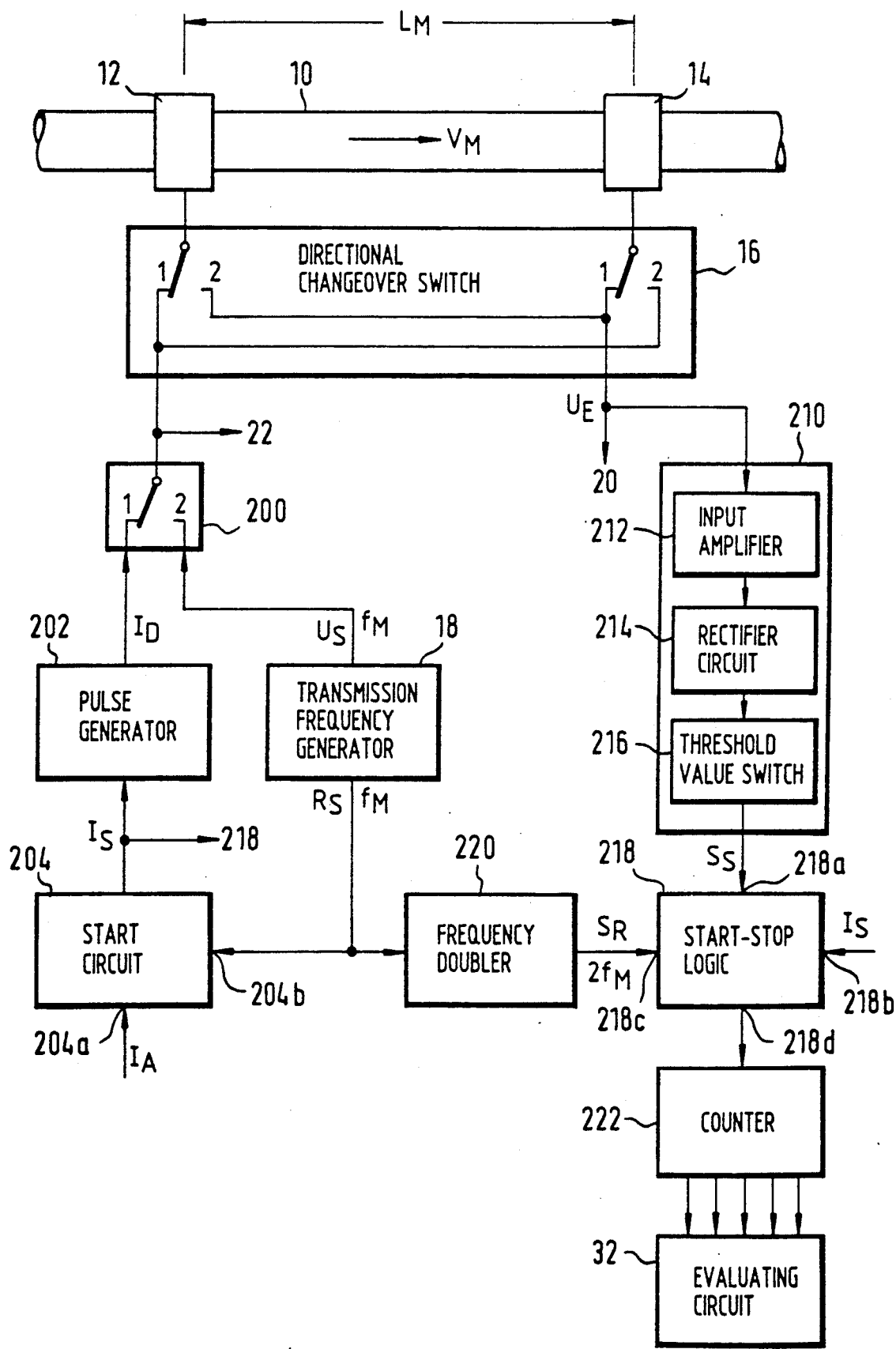
Figure 18:
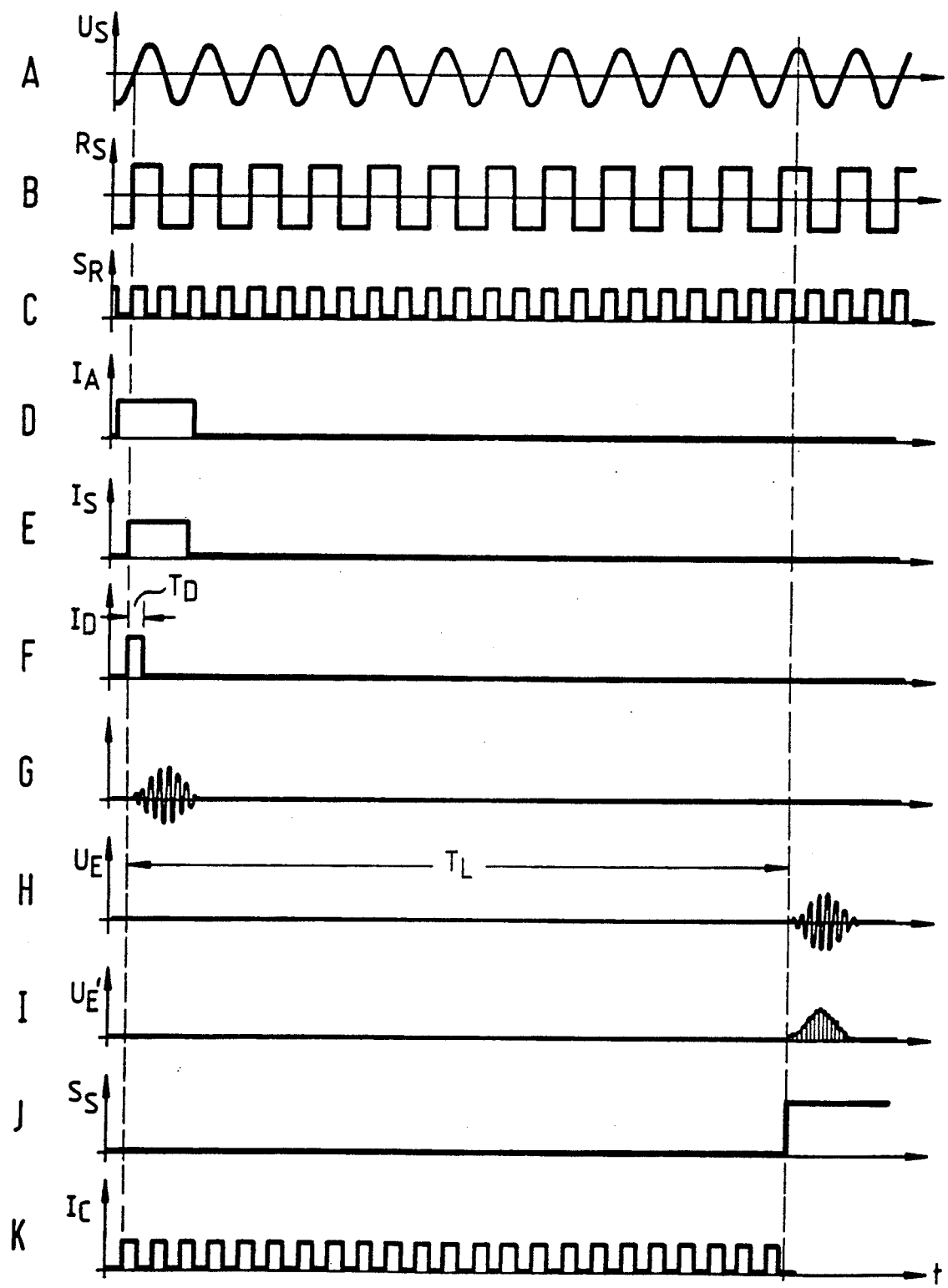
Figure 19:
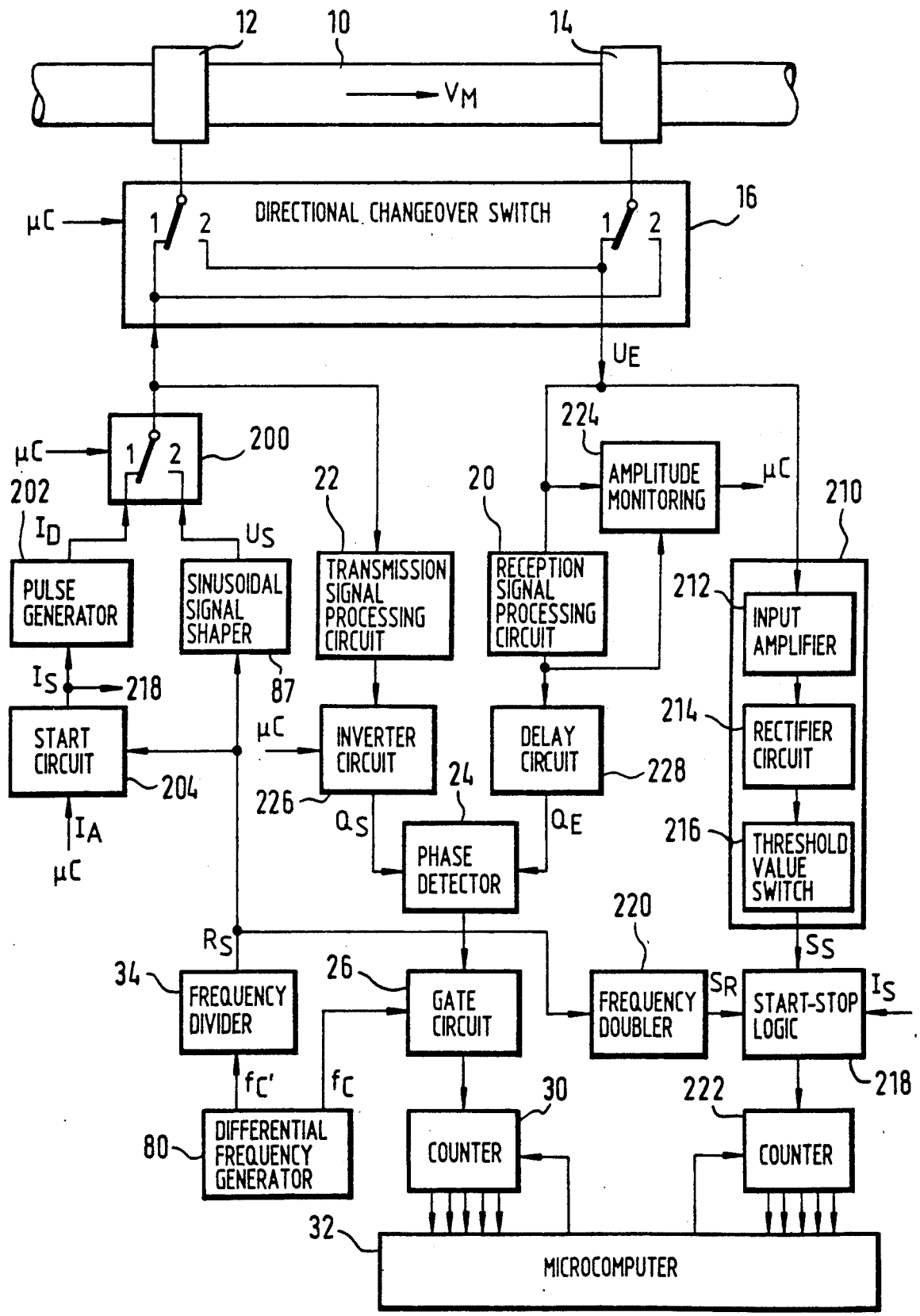
Figure 20:
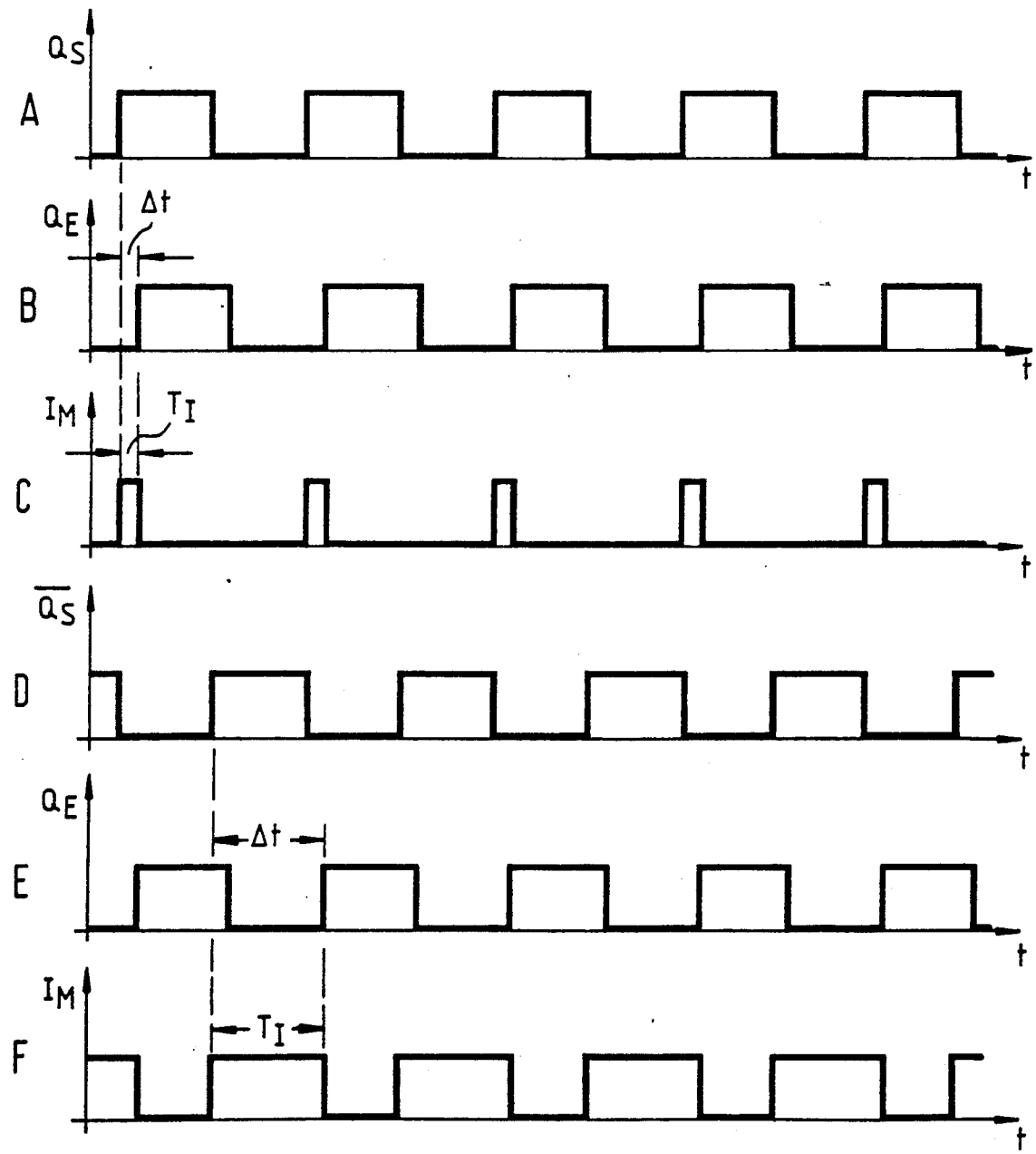

Further features and advantages will be apparent from the following description of examples of embodiment with the aid of the drawings, wherein:

FIG. 1 is a schematic illustration of a flow rate measuring arrangement in which the invention is applicable, FIG. 2 shows time diagrams of signals which arise with one mode of operation in the flow rate measuring arrangement of FIG. 1, FIG. 3 shows time diagrams of the same signals for another mode of operation of the flow rate measuring arrangement of FIG. 1, FIG. 4 shows time diagrams to explain the digital phase measurement employed in the flow rate measuring arrangement of FIG. 1, FIG. 5 is a block circuit diagram of one embodiment of the flow measuring arrangement according to the invention, FIG. 6 shows diagrams to explain the functioning of the flow rate measuring arrangement of FIG. 5, FIG. 7 is the block circuit diagram in greater detail of one embodiment of the controllable phase shifter contained in the flow rate measuring arrangement of FIG. 5, FIG. 8 shows a modified embodiment of the flow rate measuring arrangement of FIG. 5, FIG. 9 is the block circuit diagram of another embodiment of the flow rate measuring arrangement according to the invention, FIG. 10 is the circuit diagram of an embodiment of the differential counting frequency generator contained in the flow rate measuring arrangement of FIG. 9, FIG. 11 are diagrams to explain another embodiment of the flow rate measuring arrangement, FIG. 12 is the block circuit diagram of the flow rate measuring arrangement explained with the aid of FIG. 11, FIG. 13 is the block circuit diagram of another embodiment of the flow rate measuring arrangement, FIG. 14 shows diagrams to explain the functioning of the flow rate measuring arrangement of FIG. 13, FIG. 15 is a sectional view of a preferred embodiment of an ultrasonic transducer, FIG. 16 is an overall view of the flow rate measuring arrangement with a measuring tube and two ultrasonic transducers and two attenuation tubes of the type shown in FIG. 15, FIG. 17 is the block circuit diagram of an additional arrangement for determining the number of whole wavelengths in the measuring tube, FIG. 18 shows diagrams to explain the functioning of the arrangement of FIG. 17, FIG. 19 is an overall block circuit diagram of the flow rate measuring arrangement and FIG. 20 shows diagrams to explain the functioning of the inverting circuit contained in the flow rate measuring arrangement of FIG. 19.

The flow rate measuring arrangement illustrated in FIG. 1 includes a measuring tube 10 through which a medium flows in the direction of the arrow with the flow velocity $V_M$. To determine the volume flow rate of the medium it suffices to measure the flow velocity $V_M$ because the volume flow rate is equal to the product of the flow velocity $V_M$ and the known cross-sectional area of the measuring tube.

To measure the flow velocity $V_M$, at the measuring tube 10 two ultrasonic transducers 12 and 14 are arranged at an exactly known distance $L_M$ from each other. Each ultrasonic transducer can be operated optionally as transmitting transducer or receiving transducer. In the position 1 illustrated in the drawing a directional changeover switch 16 connects the ultrasonic transducer 12 to the output of a transmission frequency generator 18 and at the same time the ultrasonic transducer 14 to the input of a reception signal processing circuit 20. In its other position 2 the directional changeover switch 16 connects the ultrasonic transducer 14 to the output of the transmission frequency generator 18 and the ultrasonic transducer 12 to the input of the reception signal processing circuit 20. The directional changeover switch 16 is illustrated in the drawings symbolically by mechanical changeover contacts but in reality it is constructed in a manner known per se with electronic switching elements.

The transmission frequency generator 18 furnishes at the output an electrical transmission AC voltage $U_S$ of frequency $f_M$ which in the position of the directional changeover switch 16 illustrated is applied to the ultrasonic transducer 12. The ultrasonic transducer 12 then operates as transmitting transducer. It is so constructed that due to its excitation by the electrical transmission AC voltage $U_S$ it generates an ultrasonic wave of the same frequency $f_M$ which is propagated in the direction of the axis of the measuring tube 10 in the medium flowing through the measuring tube. Said ultrasonic wave passes in the flow direction to the ultrasonic transducer 14 which in the position 1 of the directional changeover switch 16 illustrated is connected to the input of the reception signal processing circuit 20. The ultrasonic transducer 14 thus operates as receiving transducer; it converts the incoming ultrasonic wave to a reception AC voltage $U_E$ which is supplied to the input of the reception signal processing circuit 20.

When the directional changeover switch 16 is brought into the other position 2 the ultrasonic transducer 14 receives the transmission AC voltage $U_S$ from the transmission frequency generator 18 so that it operates as transmitting transducer and generates an ultrasonic wave which is propagated in the direction of the axis of the measuring tube 10 in the medium flowing through the measuring tube 10. Said ultrasonic wave moves oppositely to the flow direction to the ultrasonic transducer 12 which is now connected to the input of the reception signal processing circuit 20 and operates as receiving transducer converting the incoming ultrasonic wave to the reception AC voltage $U_E$ which is supplied to the input of the reception signal processing circuit 20.

The diagram A of FIG. 2 shows the time profile of the transmitting AC voltage $U_S$ furnished by the transmission frequency generator 18 and of the reception AC voltage $U_E$ supplied by the receiving transducer to the reception signal processing circuit 20 in the case where the directional changeover switch 16 assumes the position 1 illustrated in FIG. 1, i.e. the ultrasonic transducer 12 operates as transmitting transducer and the ultrasonic transducer 14 as receiving transducer. Between said two AC voltages there is a total angular phase shift $\phi_1$ which results from the travel time required by the ultrasonic wave in the flowing medium to cover the distance $L_M$ from the transmitting transducer to the receiving transducer. This travel time depends on the length of the distance $L_M$ and the velocity of the ultrasonic wave relatively to the stationary ultrasonic transducers 12 and 14. Since in the case of the diagram A of FIG. 2 the ultrasonic wave covers the distance $L_M$ in the flow direction of the medium the relative velocity of the ultrasonic wave corresponds to the sum of the speed of sound c in the medium and the flow velocity $V_M$. The travel time which the ultrasonic wave requires to pass over the distance $L_M$ corresponds to a total angular phase shift $\phi_1$ which is given by the following formula:

$$\phi_1 = \omega_M \frac{L_M}{c + V_M} \quad (1)$$

Herein, $\omega_M = 2\pi f_M$ is the known angular frequency of the ultrasonic wave.

The total angular phase shift $\phi_1$ is made up of the number $m_1$ of the total wavelengths between the two transducers and the residual phase angle $\phi_{R1}$:

$$\phi_1 = \phi_{R1} + m_1 \cdot 2\pi \quad (2)$$

In corresponding manner, diagram A of FIG. 3 shows the time profile of the transmission AC voltage $U_S$ and reception AC voltage $U_E$ for the case where the directional changeover switch 16 is in the other position so that the ultrasonic transducer 14 operates as transmitting transducer and the ultrasonic transducer 12 as receiving transducer. In this case the ultrasonic wave passes over the distance $L_M$ oppositely to the flow direction so that the relative velocity of the ultrasonic wave corresponds to the difference between the velocity of sound c in the medium and the flow velocity $V_M$. Accordingly, on passing through the distance $L_M$ the ultrasonic wave undergoes a total angular phase shift $\phi_2$ which is given by the following formula:

$$\phi_2 = \omega_M \frac{L_M}{c - V_M} \quad (3)$$

This total angular phase shift $\phi_2$ is in turn made up of the number $m_2$ of the whole wavelengths between the two ultrasonic transducers and a residual phase angle $\phi_{R2}$:

$$\phi_2 = \phi_{R2} + m_2 \cdot 2\pi \quad (4)$$

By measuring the total angular phase shift $\phi_1$ the flow velocity $V_M$ desired can be calculated from formula (1) when the velocity of sound c in the medium is known:

$$V_M = \frac{\omega_M \cdot L_M}{\phi_1} - c \quad (5)$$

Correspondingly, by measuring the total angular phase shift $\phi_2$ the flow velocity $V_M$ can be calculated according to the formula (3) when the velocity of sound c is known:

$$V_M = c - \frac{\omega_M \cdot L_M}{\phi_2} \quad (6)$$

The velocity of sound c in the medium is however not constant; it changes in dependence upon the properties of the medium, in particular the temperature and density thereof. However, with the alternate measurement of the total angular phase shifts in the flow direction and opposite to the flow direction it is possible by joint evaluation of the measurement results to determine the flow velocity $V_M$ independently of the velocity of sound c in the medium. If the above equations (5) and (6) are added the result is:

$$2V_M = \frac{\omega_M \cdot L_M}{\phi_1} - \frac{\omega_M \cdot L_M}{\phi_2} \quad (7)$$

$$V_M = \frac{\phi_2 - \phi_1}{\phi_2 \cdot \phi_1} \cdot \frac{\omega_M \cdot L_M}{2} \quad (8)$$

If for $\phi_1$ and $\phi_2$ the corresponding terms according to equations (2) and (4) are inserted this gives for the flow rate to be measured:

$$V_M = \frac{\phi_{R2} - \phi_{R1}}{(\phi_{R2} + m_2 \cdot 2\pi)(\phi_{R1} + m_1 \cdot 2\pi)} \cdot \frac{\omega_M \cdot L_M}{2} \quad (9)$$

A preferred method of determining the number $m_1$ or $m_2$ of the total wavelengths along the distance $L_M$ between the two ultrasonic transducers will be described later. This determination can be made with relatively low measuring accuracy. Furthermore, determination in one direction suffices because with the flow velocities occurring the travel differences are very small and consequently as a rule $m_1 = m_2 = m$. To determine the flow velocity $V_M$ it is then also necessary to measure the residual angular phase shifts $\phi_{R1}$ and $\phi_{R2}$, i.e. the simple phase shifts between the transmission AC voltage $U_S$ and the reception AC voltage $U_E$. The accuracy with which the flow velocity $V_M$ can be determined thus depends in this measuring method on the accuracy with which the residual phase angles $\phi_{R1}$ and $\phi_{R2}$ can be measured.

Now, according to formula (9) the flow velocity $V_M$ is proportional to the difference $$\Delta\phi = \phi_{R2} - \phi_{R1}$$

between the two residual phase angles. With the flow velocities $V_M$ usually to be measured the residual phase angles $\phi_{R1}$ and $\phi_{R2}$ are of the same order of magnitude; their difference is shown exaggeratedly large in the diagrams of FIGS. 2 and 3 only for clarity. Accordingly, the phase difference $\Delta\phi$ is small compared with the magnitude of each residual phase angle $\phi_{R1}$ and $\phi_{R2}$. This results in high demands on the measurement accuracy in measuring the residual phase angles $\phi_{R1}$ and $\phi_{R2}$ because even small errors in the measurement of the two residual phase angles result in relatively large errors in the difference $\Delta\phi$ of the two residual phase angles.

In the measuring arrangement illustrated in FIG. 1 the measurement of the residual phase angles $\phi_{R1}$ and $\phi_{R2}$ is carried out digitally. For this purpose, the reception AC voltage $U_E$ is transformed in the reception signal processing circuit 20 to a square-wave voltage $Q_E$ in phase therewith and a transmission signal processing circuit 22 is connected to the output of the transmission frequency generator 18 and in said circuit the transmission AC voltage $U_S$ is converted to a square-wave voltage $Q_S$ in phase therewith. The diagrams B and C of FIG. 2 show the square-wave voltages $Q_S$ and $Q_E$ respectively for the case where the ultrasonic wave is propagated between the two ultrasonic transducers 12 and 14 in the direction of flow and the diagrams B and C of FIG. 3 show the square-wave voltages $Q_S$ and $Q_E$ for the case where the ultrasonic waves are propagated between the two ultrasonic transducers 12 and 14 oppositely to the flow direction. The edges of the square-wave voltages coincide with the zero passages of the AC voltages from which they are derived. Between the corresponding edges, i.e. for example between the rising edges of the square-wave voltages $Q_S$ and $Q_E$, there is therefore the same phase shift as between the corresponding zero passages of the AC voltage $U_S$ and $U_E$; thus, in the case of FIG. 2 this phase shift corresponds to the residual phase angle $\phi_{R1}$ and in the case of FIG. 3 to the residual phase angle $\phi_{R2}$.

As apparent from the time diagram of FIG. 2 the residual phase angle $\phi_{R1}$ corresponds to a definite time interval $\Delta t_1$ between corresponding edges of the square-wave voltage $Q_S$ and $Q_E$ because with the known angular frequency $\omega_M$ the following relationship is true:

$$\phi_{R1} = 1 \cdot 7_M \cdot \Delta t_1 \quad (10)$$

Similarly, in accordance with the time diagram of FIG. 3 the residual phase angle $\phi_{R2}$ corresponds to an exactly defined time interval $\Delta t_2$ between the corresponding edges of the square-wave voltages $Q_S$ and $Q_E$ in accordance with the relationship $$\phi_{R2} = \omega_M \cdot \Delta t_2 \quad (11)$$

Thus, for the measurement of the residual phase angles $\phi_{R1}$ and $\phi_{R2}$ it suffices to measure the time intervals $\Delta t_1$ and $\Delta t_2$ respectively proportional thereto.

The outputs of the two signal processing circuits 20 and 22 are connected to the two inputs of a phase detector 24 which at the output furnishes a train of square-wave pulses $I_M$ which are represented in the diagrams D of FIGS. 2 and 3 and referred to hereinafter as measuring pulses. The pulse repetition frequency of the measuring pulses $I_M$ corresponds to the frequency $f_M$ generated by the transmission frequency generator 18 and is referred to hereinafter as measuring frequency. Each measuring pulse $I_M$ has a duration $T_I$ which corresponds to the time interval $\Delta t_1$ and $\Delta t_2$ respectively between the rising edges of the two square-wave voltages $Q_S$ and $Q_E$ in the diagrams B and C. Such a square-wave pulse train can be generated very easily with the aid of a flip-flop which is set by the rising edge of the square-wave voltage $Q_S$ and reset by each rising edge of the square-wave voltage $Q_E$.

For measuring the time intervals $\Delta t_1$ and $\Delta t_2$ respectively proportional to the residual phase angles $\phi_{R1}$ and $\phi_{R2}$, the duration $T_I$ of the measuring pulses $I_M$ is therefore to be measured. This time measurement is carried out in digital manner in the measuring arrangement of FIG. 1 as will be explained with the aid of the diagrams of FIG. 4 where a train of measuring pulses $I_M$ of duration $T_I$ furnished by the phase detector 24 is again shown in diagram A. The output of the phase detector 24 is connected to the control input of a gate circuit 26 of which the signal input is connected to the output of a counting frequency generator 28. The counting frequency generator 28 generates a train of counting pulses $I_C$ having a repetition frequency $f_C$ substantially greater than the measuring frequency $f_M$. As an example, in diagram B of FIG. 4 such a train of counting pulses $I_C$ is illustrated. The time interval of the counting pulses $I_C$ corresponds to the period duration $T_C$ with the counting frequency $f_C$. For clarity, in diagram B of FIG. 4 the period duration $T_C$ of the counting pulse train $I_C$ is exaggerated in magnitude with respect to the period duration $T_M$ of the measuring pulses $I_M$ of the diagram A.

The output of the gate circuit 26 is connected to the counting input of a counter 30 of which the stage outputs are connected to corresponding inputs of an evaluating circuit 32 which for example may be a suitably programmed microcomputer.

The gate circuit 26 is so configured that it is open for the duration of each measuring pulse $I_M$ applied to its control input and in the opened state allows the counting pulses $I_C$ coming from the counting frequency generator 28 to pass to the counter 30 as is shown in diagram C of FIG. 4. When no measuring pulse $I_M$ is applied to the control input of the gate circuit 26 the latter blocks the transmission of the counting pulses $I_C$ to the counter 30. The counting pulses allowed to pass by the gate circuit 26 in the duration of each measuring pulse $I_M$ are counted in the counter 30 so that the latter indicates a count corresponding to the number of counting pulses output in this duration by the counting frequency generator 28. Thus, said count is a measure of the duration of the measuring pulse $I_M$. After the end of each measuring pulse $I_M$ the count of the counter 30 is transferred to the evaluating circuit 32 and the counter 30 reset to zero.

The evaluating circuit 32 thus continuously receives from the counter 30 counts which represent the duration of the measuring pulses $I_M$ furnished by the phase detector 24. When the directional changeover switch 16 is in the position 1 (FIG. 1) the counts furnished by the counter 30 are a measured value for the residual phase angle $\phi_{R1}$. When the directional changeover switch 16 is brought to the other position the counts furnished by the counter 30 are a measured value for the residual phase angle $\omega_{R2}$. In accordance with the above formula (9), from these two measured values the evaluating circuit 32 can calculate the flow velocity $V_M$ independently of the speed of sound c in the medium.

The fundamental problem caused by the quantizing error of the digital counting method is also apparent from the diagrams of FIG. 4: The resolution of the time measurement, i.e. the smallest time difference which can still be distinguished, corresponds to the period $T_C$ of the counting frequency $f_C$. To increase the resolution and thus the measurement accuracy it would therefore be necessary to make the counting frequency as high as possible. However, there are limits to this solution due to the expenditure involved. In the case of the flow velocities to be measured in practice with the ultrasonic frequencies employed the pulse durations $T_I$ of the measuring pulses $T_M$ corresponding to the residual phase angles $\phi_{R1}$ and $\phi_{R2}$ are of the order of magnitude of microseconds and the phase differences $\Delta\phi$ to be determined in accordance with the formula (9) between the residual phase angles correspond to fractions of a nanosecond. Consequently, extremely high counting frequencies $f_C$ would be necessary in order to measure each pulse duration $T_I$ with an adequately high number of counting pulses $I_C$.

FIG. 5 shows the block circuit diagram of part of the measuring arrangement of FIG. 1 for a modified embodiment which with relatively low counting frequency $f_C$ results in a considerable increase in the resolution in the digital phase measurement and accordingly an increase in the measuring accuracy in the measurement of the flow velocity $V_M$. In so far as the components of the measuring arrangement of FIG. 5 correspond to those of the measuring arrangement of FIG. 1 they are denoted with the same reference numerals as in FIG. 1 and will not be described again.

Thus, FIG. 5 again shows the two signal processing circuits 20 and 22, the phase detector 24, the gate circuit 26, the counting frequency generator 28, the counter 30 and the evaluating circuit 32. The measuring arrangement of FIG. 5 differs from that of FIG. 1 in that the measuring frequency $f_M$ is derived from the counting frequency $f_C$, this being done in particular manner in that the measuring frequency and the counting frequency remain constant but in addition the start phase $\phi_S$ (FIG. 4) which the counting pulses $I_C$ have at the start of each counting operation with respect to the phase of the measuring pulses $I_M$ is continuously rotated so that after n measurements a phase angular shift of $2\pi$ is achieved, i.e. one complete period of the counting frequency $f_C$.

For this purpose, to the output of the counting frequency generator 28 a frequency divider 34 with a division factor N is connected. The division factor N governs the ratio between the counting frequency $f_C$ and the output frequency $f_M'$ of the frequency divider 34. If for example the counting frequency generator 28 generates the counting frequency $f_C = 7$ MHz and the frequency divider 34 has the division factor $N = 128$ a frequency $f_M'$ of about 55 kHz is obtained.

The frequency divider 34 is followed by a controllable phase shifter 36 which at its output furnishes an AC voltage with the frequency $f_M$ which compared with the AC voltage applied to its input with the frequency $f_M'$ has a phase shift which depends on a phase control voltage applied to its control input 36a. The control input 36a is connected to the output of a phase control circuit 38 which after each activation by a trigger signal applied to a trigger input 38a furnishes at the output a ramp voltage $U_R$ with the time profile illustrated in diagram A of FIG. 6. The ramp voltage $U_R$ increases for a period $T_R$ linearly from a value $U_{DC}$ to a value $U_S$ and then jumps back to the value $U_{DC}$. The period $T_R$ corresponds to n periods of the measuring frequency $f_M$; the following relationship is thus true:

$$T_R = n \cdot T_M = \frac{n}{f_M} \quad (12)$$

The ramp voltage $U_R$ is so dimensioned that it rotates the start phase $\phi_S$ which the counting pulse train $I_C$ has with respect to the start of each measuring pulse $I_M$ in the course of the period $T_R$, i.e. in n consecutive measuring pulses $I_M$, through $2\pi$, i.e. one complete period of the counting frequency $f_C$. This results in the time profile of the start phase $\phi_S$ illustrated in diagram B of FIG. 6. A constant start phase $\phi_0$ corresponds to the initial value $U_{DC}$ of the ramp velocity $U_R$ and the start phase $\phi_0 + 2\pi$ corresponds to the end value $U_S$ of the ramp voltage $U_R$. Since in each period of the measuring frequency $f_M$ a phase measurement operation is carried out by counting the counting pulses $I_C$ in the counter 30, the start phase $\phi_S$ shifts continuously from measuring operation to measuring operation. In the $p^{th}$ measurement in the course of the period $T_R$ it has the value $$\phi_S(p) = p \cdot \frac{2\pi}{n} + \phi_0 \quad (13)$$

(with $p = 0 \ldots n$)

However, the phase shifter 36 no longer performs the phase shift on the counting frequency $f_C$ but on the frequency $f_M'$ derived therefrom, for which the following is true:

$$f_M' = \frac{f_C}{N} \quad (14)$$

Between the start phase $\phi_S$ in the counting frequency $f_C$ and the phase $\phi_M$ in the measuring frequency $f_M$ the following relationship applies:

$$\phi_S = N \cdot \phi_M \quad (15)$$

The phase shift to be generated by the phase shifter 36 must thus be a factor N times smaller than the desired phase shift of the start phase $\phi_S$ as illustrated in diagram C of FIG. 6. Between the values $U_{DC}$ and $U_S$ of the ramp voltage $U_R$ the phase shift generated by the phase shifter 44 changes by $2\pi/N$. In the $p^{th}$ measurement it has in the course of the period $T_R$ the value $$\phi_M(p) = p \cdot \frac{2\pi}{N \cdot n} + \phi_0 \quad (16)$$

(with $p = 0 \ldots n$)

The continuous phase shift between the frequency $f_M'$ and $f_M$ during the period $T_R$ of each ramp of the ramp voltage $U_R$ is equivalent to a frequency change. The following is then true $$f_M = f_M' \left( 1 + \frac{1}{N \cdot n} \right) \quad (17)$$

Since however $N \cdot n \gg 1$ we have approximately $$f_M \approx f_M' \quad (18)$$

The output voltage of the phase shifter 36 can represent the transmitting AC voltage $U_S$ directly. The transmission frequency generator 18 of FIG. 1 is thus replaced in the measuring arrangement of FIG. 5 by the frequency divider 34 and the phase shifter 36 in conjunction with the phase control circuit 38.

The continuous variation of the start phase $\phi_S$ by $2\pi$ in the course of n consecutive measurements has the effect that during part of the measurements a predetermined number k and during the remaining measurements a number $k+1$ of counting pulses $I_C$, greater by 1, is counted during the duration $T_I$ of each measuring pulse $T_M$. By suitable evaluation of the n measured values obtained in each measuring cycle of duration $T_R$ the resolution and thus the measuring accuracy can be considerably increased without correspondingly increasing the counting frequency $f_C$. The continuous phase shift through $2\pi$ in n consecutive stages corresponds as it were to a division of the quantizing step corresponding to the counting period $T_C$ into n substeps. If it were possible to completely eliminate all other random errors, such as thermal noise, flow noise, etc., this would give an increase of the resolution by the factor n.

The preferred evaluation of the measurement results obtained in this manner reside in that the mean value of the n counts obtained in the course of each measuring cycle is formed. The residual phase angle corresponding to the mean value is then employed to calculate the flow velocity $V_M$ in accordance with the formula (9).

The activation of the phase control circuit 38 is preferably in time with the switchover of the directional changeover switch 16. The n measured values for the measurement with the flow direction and in the following measuring cycle the n measured values for the measurement against the flow direction are then obtained alternately in a measuring cycle of duration $T_R$. Thus, after every two consecutive measuring cycles the two residual phase angles required for the calculation of the flow velocity in accordance with equation (9) are available with increased measuring accuracy.

FIG. 7 shows an example of embodiment of the controllable phase shifter 36 in greater detail. FIG. 7 also shows the counting frequency generator 28, the frequency divider 34 and the phase control circuit 38.

The counting frequency generator 28 is synchronously phase-locked by a quartz generator 40. This synchronization ensures that the start phase is turned exactly through one whole period $2\pi$ of the counting frequency $f_C$ over the n measurements in each measuring cycle of duration $T_R$. Furthermore, the counting frequency generator 28 is preferably so constructed that the counting frequency $f_C$ is adjustable in a relatively large range, for example between 2 and 11 MHz. To obtain a phase-locked control in conjunction with an adjustable frequency the counting frequency generator 28 may be provided in known manner with a phase-locked circuit known under the designation PLL (phase locked loop). Such a PLL circuit includes a digital frequency divider having a division factor which is adjustable by a digital control circuit and governs the frequency furnished at the output. It is indicated in FIG. 7 that the digital control signal is supplied to a control input 28a of the counting frequency generator 28. The phase shifter 36 is likewise formed by a PLL circuit 50. The PLL circuit 50 contains in cascade a phase comparator 52, a low-pass filter 54, a summation circuit 56 and a voltage-controlled oscillator 58 also known under the term VCO (voltage-controlled oscillator). Such a voltage-controlled oscillator furnishes of course at its output an AC voltage having a frequency depending on a frequency control voltage applied to its control input.

The phase comparator 52 receives at one input the output signal of the frequency divider 34 and at the other input the output AC voltage of the frequency-controlled oscillator 58. It furnishes at the output a control deviation signal depending on the phase difference between its two input signals. The control deviation signal is supplied after filtering in the low-pass filter 54 to the one input of the summation circuit 56 which at the other input receives the ramp voltage $U_R$ from the output of the phase-control circuit 38. The summation voltage formed in the summation circuit 56 is supplied as frequency control voltage to the control input of the voltage-controlled oscillator 58.

The PLL circuit 50 forces frequency identity between the output frequency $f_M'$ of the frequency divider 34 supplied to the one input of the phase comparator 52 and the output voltage $f_M$ of the voltage-controlled oscillator 58 supplied to the other input of the phase comparator 52. To ensure that this frequency identity is retained the frequency control voltage supplied to the voltage-controlled oscillator 58 must always have the constant value corresponding to the frequency $f_M$. Now, however, this frequency control voltage derives from the sum of the continuously rising ramp voltage $U_R$ and the output voltage of the phase comparator 52. To ensure the frequency control voltage remains constant the output voltage of the phase comparator 52 must therefore be varied oppositely to the ramp voltage $U_R$. The necessary change in the output voltage of the phase comparator 52 is obtained as a result of a change in the mutual phase position of its two input voltages. The PLL circuit therefore compels a continuous shift of the phase position of the output AC voltage of the voltage-controlled oscillator 52 with respect to the phase position of the output AC voltage of the frequency divider 34 for compensating the continuously increasing ramp voltage $U_R$. Thus, the embodiment of the phase shifter 36 illustrated gives exactly the effect outlined previously with reference to FIG. 5.

The phase-control circuit 38 of FIG. 7 includes a sawtooth generator 60 and a parameter control circuit 62. The parameter control circuit 62 governs in particular the two voltage values $U_{DC}$ and $U_S$ between which the ramp voltage $U_R$ changes. With the parameter $U_{DC}$ the constant phase angle $\phi_0$ can be adjusted. With the parameter $U_S$ the maximum phase shift over the duration $T_R$ of each rising edge of the ramp voltage $U_R$ may be set. The parameter control circuit 62 also receives the counting frequency $f_C$ so that the activation of each ramp by the trigger signal supplied to the input 38a takes place in a defined time relationship to the counting pulses.

FIG. 8 shows a modified embodiment of the arrangement of FIG. 5 in which the phase-control circuit is formed by a digital-analog converter 70 which converts a digital code group furnished by the evaluating circuit 32 to an analog voltage which is applied as phase control voltage to the input 36a of the phase shifter 36. The microcomputer forming the evaluating circuit 32 can thus control the variation of the start phase $\phi_S$ within the course of a measuring cycle in accordance with a predetermined program. In this manner the exact measured value of the residual phase angle may also be obtained in a way different to the formation of the mean value over n consecutive measurements. In particular, a successive approximation may be carried out by which by a weighting method the transition from k counting pulses to k+1 counting pulses per measuring pulse duration $T_I$ is approached. The phase shifter 36 is driven in discrete steps by the microcomputer 32 via the digital-analog converter 70. An increase in the resolution by the factor $2^p$ can then be obtained in p steps.

FIG. 9 shows a further embodiment of the flow rate measuring arrangement with which a continuous change of the start phase $\phi_S$ by $2\pi$ in the course of n consecutive measuring pulses $I_M$ is obtained by employing two frequencies displaced with respect to each other. FIG. 9 again shows the gate circuit 26 to the control input of which the measuring pulses $I_M$ of duration $T_I$ and repetition frequency $f_M$ are applied along with the counter 30 connected to the output of the gate circuit 26 and the evaluating circuit 32. The counting pulses $I_C$ with the counting frequency $f_C$ are furnished by the output 80a of a differential counting frequency generator 80 which furnishes at a further output 80b a frequency $f_C'$ which differs by a differential frequency $\Delta f$ from the counting frequency $f_C$, whereby:

$$f_C' = f_C \pm \Delta f \qquad (19)$$

The measuring frequency $f_M$ is derived by frequency division in the frequency divider 34 with the division factor N from the frequency $f_C'$. Accordingly, the counting frequency $f_C$ is not an integer multiple of the measuring frequency $f_M$ and consequently a continuous phase shift of the start phase $\phi_S$ of the counting takes place with respect to the measuring pulses $I_M$ in consecutive periods of the measuring frequency $f_M$. By suitable dimensioning of the differential frequency $\Delta f$ it may be achieved that the start phase $\phi_S$ changes in n consecutive periods of the measuring frequency $f_M$ by precisely $2\pi$, i.e. by one whole period of the counting frequency $f_C$. This is the case when the differential frequency $\Delta f$ has the following value:

$$\Delta f = \frac{f_M}{n} \tag{20}$$

If for example the measuring frequency $f_M = 55.6$ kHz and the phase rotation through $2\pi$ is to be obtained in $n = 1000$ consecutive periods of the measuring frequency $f_M$, the differential frequency is:

$$\Delta f = \frac{55.6 \text{ kHz}}{1000} = 55.6 \text{ Hz} \tag{21}$$

For the ratio between the counting frequency $f_C$ and the measuring frequency $f_M$ the following applies:

$$f_C = f_{C'} \pm \frac{f_M}{n} \tag{22}$$

$$f_C = N \cdot f_M \pm \frac{f_M}{n} \tag{23}$$

FIG. 10 shows an example of embodiment of the differential counting frequency generator 80 of FIG. 9 with which two frequencies $f_C$ and $f_{C'}$ can be obtained which differ exactly by the desired differential frequency $\Delta f$. Said differential counting frequency generator contains a phase comparator 81 which at one input receives a reference frequency $f_{Ref}$ which is preferably derived from a quartz oscillator and is for example 1 kHz. The output signal of the phase comparator 81 is supplied after filtering in a low-pass filter 82 to a first voltage-controlled oscillator 83 directly and to a second voltage-controlled oscillator 84 via a summation circuit 85 for frequency control. The voltage-controlled oscillator 83 furnishes at the output the frequency $f_{C'}$ which after frequency division with the division factor N in a frequency divider 86 (which corresponds to the frequency divider 34 of FIG. 9) gives the measuring frequency $f_M$. Since the output voltage $R_S$ of the frequency divider 86 is a square-wave voltage it is transformed in a signal shaper 87 to a sinusoidal voltage of the same frequency $f_M$ which then forms the transmission AC voltage $U_S$.

The output of the frequency divider 86 is further connected via a second frequency divider 88 to the second input of the phase comparator 81. In this manner a PLL circuit of known type is formed which by phase-locked control keeps the measuring frequency $f_M$ in a ratio to the reference frequency $f_{Ref}$ governed by the division factor of the second frequency divider 88. The division factor of the frequency divider 88 is preferably digitally adjustable so that the measuring frequency $f_M$ can be adjusted within a certain range to a desired value. The constant ratio governed by the division factor N of the frequency divider 86 is always retained between the set value of the measuring frequency $f_M$ and the frequency $f_{C'}$.

The output of the voltage-controlled oscillator 83 is further connected to the one input of a phase comparator 90, to the other input of which the output signal of the other voltage-controlled oscillator 84 with the frequency $f_C$ is supplied. The output of the phase comparator 90 is connected via a low-pass filter 91 to a square-wave signal shaper 92 which is formed for example by a Schmitt trigger. At the output of the square-wave signal shaper a square-wave signal having the frequency $$\Delta f = |f_{C'} - f_C| \tag{24}$$

is obtained which is supplied to the one input of a phase comparator 93. The other input of the phase comparator 3 receives the output signal of a frequency divider 94 which divides the output frequency $f_M$ of the frequency divider 86 by the factor n. The output of the phase comparator 93 is connected via a low-pass filter 95 to the second input of the summation circuit 85, the output voltage of which forms the frequency control voltage for the voltage-controlled oscillator 84. The voltage-controlled oscillator 84 thus lies in a frequency-control loop which keeps its output voltage $f_C$ at a constant frequency distance $\Delta f$ from the output frequency $f_{C'}$ of the voltage-controlled oscillator 83, said frequency difference $\Delta f$ always being kept equal to the output frequency of the frequency divider 94. Consequently:

$$\Delta f = \frac{f_M}{n} \tag{25}$$

$$f_C = N \cdot f_M \pm \frac{f_M}{n} \tag{26}$$

The circuit of FIG. 10 thus furnishes at the output of the voltage-controlled oscillator 84 a counting frequency $f_C$ which fulfills the condition given by equation (23).

Another possibility for continuously varying the start phase $\phi_S$ from measuring cycle to measuring cycle resides in imparting to the counting frequency $f_C$ a frequency modulation whilst the frequency and the phase of the transmission AC voltage $U_S$ remain constant. In FIG. 11, as example three modulation signals are illustrated with which the frequency modulation of the counting frequency $f_C$ can be effected. The diagram A of FIG. 11 shows a sinusoidal modulation signal, diagram B a sawtooth-shaped modulation signal with linearly rising ramp and diagram C a random signal. In each case the frequency change takes place with a predetermined frequency swing $f_h$ about a middle frequency $f_{C0}$ so that the counting frequency $f_C$ varies between the values $f_{Cmin} = f_{C0} - f_h/2$ and $f_{Cmax} = f_{C0} + f_h/2$. The modulation signals of diagrams A and B are periodic signals and have the advantage that they ensure a uniform fluctuation of the counting frequency $f_C$ varies about the middle frequency $f_{C0}$. This effect can also be achieved with the random signal of diagram C if the modulation signal is generated by a pseudo-random generator known per se and having a predetermined period. In all these cases the period duration of the modulation signal is equal to the duration $T_R$ of the measuring cycle. A further possibility of frequency modulation resides in that the counting frequency $f_C$ is subjected within a fixedly predetermined frequency band to random fluctuations which are statistically substantially equally distributed This can be achieved in particular in that as modulation signal a noise signal with bandwidth limitation is employed. By the bandwidth limitation the speed with which the counting frequency $f_C$ varies about the middle frequency $f_{C0}$ upwards and downwards can be limited. Preferably, for the upper limit frequency $f_{Gmax}$ the bandwidth limitation $$f_{Gmax} << \frac{2}{\Delta t} \text{ or } f_{Gmax} << \frac{2}{T_I} \quad (27)$$

applies and for the lower limit frequency $f_{Gmin}$ the bandwidth limitation $$f_{Gmin} >> \frac{1}{T_R} \quad (28)$$

FIG. 12 shows an embodiment of the flow rate measuring arrangement in which a frequency modulation of the counting frequency $f_C$ is effected by a bandwidth-limited noise signal. FIG. 12 again shows the phase detector 24, the gate circuit 26, the counter 30 and the evaluating circuit 32 of FIG. 1. These circuit components have the same function as in FIG. 1 and will not be described again.

The frequency modulation of the counting frequency $f_C$ is by a frequency modulator 100 configured as PLL circuit. A quartz generator 102 supplies a fixed reference frequency via a frequency divider 104 to an input of phase comparator 106. The output of the phase comparator 106 is connected via a low-pass filter 108 to the one input of a summation circuit 110 which at the other input receives the modulation signal which is supplied by a noise generator 112 via a bandpass filter 114. The output of the summation circuit 110 is connected to the control input of a voltage-controlled oscillator 116, the output signal of which is supplied via a frequency divider 118 to the other input of the phase comparator 106. In addition, a pulse shaper 120 of which the output is connected to the signal input of the gate circuit 26 is connected to the output of the voltage-controlled oscillator 116.

The function of the circuit of FIG. 12 is immediately clear: The frequency of the quartz generator 102 divided down by the frequency divider 104 is compared in the phase comparator 106 with the output frequency of the voltage-controlled oscillator 116 divided down by the frequency divider 118. The output signal of the phase comparator 106 is applied after low-pass filtering in the low-pass filter 108 via the summation circuit 110 to the control input of the voltage-controlled oscillator 116. If this signal alone were present it would keep the output frequency of the voltage-controlled oscillator 116 constantly at the middle frequency $f_{C0}$ of the counting frequency $f_C$. Because the bandpass-filtered noise signal is superimposed on the output signal of the phase comparator 106 in the summation circuit 110 the output frequency of the voltage-controlled oscillator 116 is subjected to a frequency modulation so that it fluctuates between the values $f_{C0}+f_h/2$ and $f_{C0}-f_h/2$. The frequency-modulated output signal of the voltage-controlled oscillator 116 is transformed by the pulse shaper 120 to a pulse train having a repetition frequency which is frequency-modulated in the same manner Said pulse train represents the counting pulse train $I_C$ which is transmitted via the gate circuit 26 to the counter 30 when said circuit is open due to a measuring pulse $I_M$ supplied by the phase detector 24.

If the noise generator 112 is constructed as pseudo random generator it preferably comprises a reset input 122 to which on each start of a measuring cycle a reset pulse is supplied by which it is reset to a defined initial state. This prevents the mean value of the counting frequency value varying in the duration of a measuring cycle for determining a mean phase shift. This optimizes the stability of the mean counting frequency $f_{C0}$.

The circuit of FIG. 12 can be easily modified so that the counting frequency $f_C$ is modulated by a periodic modulation signal, for example by a sinusoidal modulation signal according to the diagram A of FIG. 11 or by a sawtooth-shaped modulation signal according to the diagram B of FIG. 11. For this purpose the noise generator 112 and the bandpass 114 of FIG. 12 are replaced by a sinusoidal or sawtooth generator, the output signal of which is superimposed on the output signal of the phase comparator 106 in the summation circuit 110.

In all the previously described embodiments of the flow rate measuring arrangement the counting pulses are generated continuously but to increase the measuring accuracy in the phase difference measurement different measures are employed to cause a systematic or random change of the start phase at the beginning of each measuring time interval. The embodiment of the flow rate measuring arrangement illustrated in FIG. 13 differs from these embodiments fundamentally in that in each case a counting pulse train with repetition frequency $f_C$ is generated only during each measuring time interval, the influencing of the start phase necessary to increase the measuring accuracy being effected in that each counting train pulse starts at the beginning of a measuring time interval exactly with the phase position with which the preceding counting train pulse was terminated at the end of the preceding measuring time interval.

FIG. 13 again shows the phase detector 24, the counter 30 and the evaluating circuit 32 of FIG. 1. The output of the phase detector 24 at which the measuring pulses $I_M$ with the duration $T_I$ appear is connected to a control input of a delta generator 124. The output voltage $U_D$ of the delta generator 124 is supplied to the input of a counting pulse shaper 126 which at its output furnishes the counting pulses $I_C$ which are supplied to the counter 30.

The functioning of the circuit of FIG. 13 will now be explained with the aid of the diagrams of FIG. 14. In FIG. 14 diagram A shows the measuring pulses $I_M$ furnished by the phase detector 24, diagram B the output voltage $U_D$ of the delta generator 124 and diagram C the counting pulses delivered by the counting pulse shaper 126 to the counter 30.

The delta generator 124 is constructed in such a manner that it generates a delta voltage with the frequency $f_C$ only when a measuring pulse $I_M$ is applied to its control input. On termination of the measuring pulse $I_M$ the delta generator 124 is stopped so that it moves to a hold state. This hold state is distinguished in that the output voltage $U_D$ is not reset but retains the signal level reached on stopping. This signal level may for example be stored in a capacitor. At the start of the next measuring pulse $I_M$ the hold state is terminated and the delta generator 124 continues the generation of the delta voltage from the stored signal level onwards.

The counting pulse shaper 126 transforms the output voltage $U_D$ of the delta generator 124 to counting pulses $I_C$ phase-synchronous therewith. This can be done in simple manner in that generation of a counting pulse is initiated when the voltage $U_D$ exceeds a predetermined threshold value $U_{D1}$ and that the counting pulse is terminated when the voltage $U_D$ drops below a predetermined lower threshold value $U_{D2}$. Thus, for the duration of each measuring pulse $I_M$ the counting pulse shaper 126 furnishes at its output a number of counting pulses $I_C$ which is equal to the number of periods of the triangular voltage generated in this duration. In contrast, no counting pulses are generated during the pause between two measuring pulses $I_M$. By storing the signal level of the voltage $U_D$ it is ensured that the last counting pulse period $T_C$ which started at the end of a measuring time interval of duration $T_I$ but was not longer completed is completed at the start of the next measuring time interval. Consequently, with these counting methods the durations $T_I$ of the measuring pulses $I_M$ occurring successively in the course of a measuring cycle can nevertheless follow each other without gaps and can be measured without error by adding up the corresponding counts. For example, in diagram C of FIG. 14 in the first measuring time interval five complete counting pulses $I_C$ occur. The incomplete pulse gap after the last counting pulse is completed at the start of the second measuring time interval. Likewise, in the second measuring time interval five complete counting pulses appear and a started sixth counting pulse which is completed at the beginning of the third measuring time interval. If the counter 30 responds in each case to the rising edges of the counting pulses $I_C$, in the first measuring time interval the count "5" results and in the second measuring time interval the count "6". Thus, a so-called "residual phase error" which arose in system-inherent manner in the first measuring time interval is cancelled out in the second measuring time interval. Generally speaking this means that a residual phase error accumulating in several consecutive measuring time intervals is compensated in a following measuring time interval.

In all the embodiments of the flow meter described above it is presumed that the acoustic wave is propagated in the direction of the axis of the measuring tube 10 from the transmitting transducer to the receiving transducer. Of course, this can be achieved not only by the arrangement of the ultrasonic transducers shown in FIG. 1 but naturally also by arranging them in such a manner that the major propagation of the ultrasonic waves does not coincide with the measuring tube axis as in FIG. 1.

The two ultrasonic transducers 12 and 14 of FIG. 1 must be so configured that when operated as transmitting transducers they can generate such an acoustic wave and when operated as receiving transducers they can convert such an acoustic wave with adequate sensitivity to an electrical receiving signal. In addition, in particular with flow meters of small nominal widths, it is desirable for the flow cross-section of the flow meter not to be restricted by the ultrasonic transducers. In FIG. 15 a preferred embodiment of an ultrasonic transducer is shown which fulfills these conditions.

The ultrasonic transducer 130 illustrated in FIG. 15 consists of an annular piezocrystal 132 which is provided at its two end faces with metallizations 134 and 136 serving as electrodes. The piezocrystal may consist of lead-zirconium titanate, barium titanate or another suitable piezoelectric material. The ultrasonic transducer 130 is accommodated in a chamber 140 which is formed by recesses in a flange 142 attached to the measuring tube 110 and in an annular counter plate 146 secured by means of threaded bolts 144 to the flange 142. The counter plate 146 consists of the same material as the measuring tube 10 and the flange 142, this material preferably being stainless steel.

To prevent the piezocrystal 132 from being attacked by a chemically aggressive medium, on its inner peripheral surface a protective layer 138 of a material resistant to the chemically aggressive medium is applied. Depending on the nature of the chemically aggressive medium the protective layer 138 may consist of metal, such as gold, silver or titanium, or of glass, plastic, ceramic or the like. It is particularly favourable for the material of the protective layer 138 to have an acoustic characteristic impedance which lies between the acoustic characteristic impedance of the piezocrystal 132 and the acoustic characteristic impedance of the medium so that the protective layer effects an acoustic impedance matching at the same time. If the medium is not aggressive the protective layer 138 may be omitted so that the inner peripheral surface of the piezocrystal 132 is then in direct contact with the medium flowing through the flow meter.

The annular piezocrystal 132 is clamped between the flange 142 and the counter plate 146 with insertion of sealing rings 150 and 152. The sealing rings 150, 152 and the piezocrystal 132 with the protective layer 138, the flange 142 and the counter plate 146 have the same internal diameter as the measuring tube 10 so that a continuously uniform flow cross-section results which is not impaired by installation of the ultrasonic transducer. The sealing rings 150, 152 serve on the one hand to seal the clamping point and on the other for acoustic uncoupling of the ultrasonic transducer 130 from the tube sections adjoining in both directions. The material of the sealing rings 150, 152 is selected so that it fulfills these two purposes as well as possible and is also resistant to the media flowing through the flow meter. To obtain good acoustic uncoupling the acoustic characteristic impedance of the sealing rings 150, 152 should be substantially smaller than the acoustic characteristic impedance of the measuring tube 10. Viton has proved to be a particularly suitable material for the sealing rings 150, 152. On assembling together the flange 142 and the counter plate 146 the sealing rings 150, 152 are given a predetermined compression.

To ensure that the ultrasonic transducer 130 generates in the medium an acoustic wave propagated in the axial direction it is excited for the phase measurement by the transmitting AC voltage $U_S$ applied to its electrodes 134, 136 in such a manner that it oscillates radially, its internal diameter and external diameter preferably varying in phase. The variations of the internal diameter cause pressure fluctuations in the medium which are propagated as ultrasonic waves. Although the electrodes 134 and 136 lie parallel to the desired oscillation direction a radial oscillation can be generated in that the frequency $f_M$ of the transmitting AC voltage $U_S$ is made equal to the radial resonant frequency of the piezocrystal 132. This radial resonant frequency is lower than the longitudinal resonant frequency at which the piezocrystal 132 oscillates parallel to the axial direction, i.e. perpendicularly to the electrodes 134 and 136.

Although application of an AC voltage between the electrodes 134 and 136 first causes thickness changes of the piezocrystal 132 perpendicularly to said electrodes, these thickness changes are accompanied by contractions in the radial direction which build up to radial oscillations when the condition of radial resonance is fulfilled.

The radial resonant frequency depends on the dimensions of the piezocrystal 132 and can therefore be adjusted by selecting these dimensions. In order to measure in accordance with the theory a mean flow velocity independent of the flow profile planar waves must be propagated in the measuring tube 10. To ensure that planar waves can form in a tube two conditions must be fulfilled:

1. the wavelength in the medium must be appreciably greater than the internal diameter of the measuring tube, preferably greater than 1.6 times said internal diameter;
2. the acoustic characteristic impedance (acoustic stiffness) of the measuring tube must be substantially greater than that of the medium.

The first condition is fulfilled in that the radial resonant frequency of the piezocrystal 132 is set by appropriate choice of its dimensions to a value at which the wavelength of the ultrasonic waves in the medium is greater than the internal diameter of the measuring tube. With an internal diameter of the measuring tube of 8 mm this condition is for example fulfilled when the radial resonant frequency of the piezocrystal 132 and thus the frequency $f_M$ of the transmitting AC voltage $U_S$ is about 62 kHz.

The second condition is fulfilled by suitable choice of the material of the measuring tube 10. For example, a measuring tube of stainless steel has an acoustic characteristic impedance which is large compared with the acoustic characteristic impedance of any flow medium occurring.

The two ultrasonic transducers of the flow rate measuring arrangement have the same structure and accordingly also the same radial resonant frequency. If the ultrasonic wave generated by one ultrasonic transducer meets the other ultrasonic transducer the piezocrystal 132 thereof is stimulated by the pressure fluctuations to radial oscillations at the radial resonant frequency. These radial oscillations are accompanied by contractions in the longitudinal direction by which an AC voltage of the same frequency is generated between the electrodes 134 and 136 and represents the receiving AC voltage $U_E$. Thus, any ultrasonic transducer constructed in the manner of FIG. 15 can operate selectively as transmitting transducer or receiving transducer.

Since the ultrasonic transducers are operated in resonance a very good power transmission is obtained from the transmitting transducer to the receiving transducer. This is of great advantage because it makes it possible to obtain with relatively low transmitting power an adequately large receiving AC voltage of for example 100 mV. A further advantage of the resonance operation of the relatively narrow band transducers is that interfering noises in the medium caused for example by pumps, valves or the like are filtered out directly at the measuring pickup.

Since the ultrasonic waves generated by the transmitting transducer are propagated in the flowing medium in opposite directions it is necessary to dampen the ultrasonic waves moving away from the measuring tube to ensure that no measuring errors are caused by sound reflections in the conduit system containing the measuring tube. For this purpose, on the side of the ultrasonic transducer 130 opposite the measuring tube 10 an attenuation tube 160 is arranged. The attenuation tube 160 consists of a steel tube 162 lined on the inside with a nonporous damping material 164. Integrally formed on the steel tube 162 is a flange 166 which with insertion of a seal 168 is secured by means of screws 169 to the counter plate 146.

Teflon has proved to be particularly well suited as damping material. Of course, the internal diameter of the steel tube 162 is dimensioned corresponding to the thickness of the damping material 164 so that the free internal diameter of the damping tube 160 is equal to the internal diameter of the measuring tube 10.

Since the flow meter comprises at each end of the measuring tube 10 an ultrasonic transducer of the type illustrated in FIG. 15, on each side of the measuring tube an attenuation tube is disposed so that the overall construction illustrated in FIG. 16 is obtained. FIG. 16 shows the measuring tube 10 with the flanges 142 integrally formed at its two ends and the counter plates 146 which surround the chambers in which the piezoelectric transducers are arranged. At the flanges 142 the passages 170 for the electrical lines leading to the electrodes of the piezocrystals are also illustrated. On each side of the measuring tube 10 an attenuation tube 160 is arranged which is secured by means of its flange 166 to the associated counter plate 146. Each attenuation tube 160 comprises at the other end a flange 172 for connection to the conduit system.

In order to be able to calculate the flow velocity $V_M$ in accordance with equation (9), apart from the residual phase angles it is also necessary to know the number $m_1$ or $m_2$ of the whole wavelengths along the distance $L_M$ between the two ultrasonic transducers. As explained with regard to equation (9) it may be assumed that the number of the whole wavelengths in the two measuring directions is the same and consequently:

$$m_1 = m_2 = m \qquad (29)$$

It therefore suffices to determine the number of the whole wavelengths in one measuring direction. Since depending on the velocity of sound in the medium a different number m results the number m must be measured. The necessary accuracy is therefore relatively low. Errors which may arise at the transition from m to $m+1$ or $m-1$ can easily be determined by a plausibility test and corrected.

FIG. 17 shows a block circuit diagram of an arrangement which is added to the flow rate measuring arrangement of FIG. 1 to determine the number m of the whole wavelengths by a travel time measuring method. This arrangement is particularly suitable for the case where the ultrasonic transducers are formed by annular piezoelectric transducers of the type illustrated in FIG. 15. In FIG. 17, of the flow rate measuring arrangement of FIG. 1 for simplification apart from the measuring tube 10 with the two ultrasonic transducers 12 and 14 and the directional changeover switch 16 only the transmitting frequency generator 18 is illustrated. The remaining components of the flow rate measuring arrangement of FIG. 1 are required only for the phase measurement but not for determination of the number m of the entire wavelengths.

In FIG. 17 between the transmission frequency generator 18 and the transmitting-side input of the directional changeover switch 16 a changeover switch 200 is inserted which in the illustrated position 1 separates the directional changeover switch 16 from the output of the transmission frequency generator 18 and connects it to the output of a pulse generator 202. For the phase measurement the changeover switch 200 is brought into the other position 2 in which it separates the directional changeover switch 16 from the output of the pulse generator 202 and connects it to the output of the transmission frequency generator 18 so that the flow rate measuring arrangement corresponds to the illustration of FIG. 1.

The pulse generator 202 has a trigger input which is connected to the output of a start circuit 204. The start circuit 204 has in turn a trigger input 204a and a synchronizing input 204b connected to an output of the transmission frequency generator 18 at which a square-wave signal $R_S$ is furnished which has the same frequency $f_M$ and the same phase position as the transmission AC voltage $U_S$. If the transmission frequency generator corresponds to the embodiment of FIGS. 9 and 10 such a square-wave signal is for example available at the output of the frequency divider 34 or 86, respectively. Moreover, in all the examples of embodiment there is a corresponding square-wave signal in the form of the signal $Q_S$ at the output of the transmission signal processing circuit 22.

When a trigger pulse $I_A$ is applied to the trigger input 204a of the start circuit 204 the latter sends to the pulse generator 202 a start pulse $I_S$ which has an exactly defined time position relatively to the square-wave voltage $R_S$ furnished by the transmission frequency generator 18 and thus also to the transmission AC voltage $U_S$. On every reception of a start pulse the pulse generator 202 generates a short single pulse $I_D$. When the changeover switch 200 is in position 1 said single pulse $I_D$ is supplied to the ultrasonic transducer 12 or 14 which is selected as transmitting transducer by the setting of the directional changeover switch 16.

A pulse receiving circuit 210 is connected to the receiving-side output of the directional changeover switch 16 parallel to the reception signal processing circuit 20 (FIG. 1) (not illustrated in FIG. 17) and includes in series an input amplifier 212, a rectifier circuit 214 and a threshold value switch 216. The output of the threshold value switch 216 is connected to a stop input 218a of a start-stop logic 218 which receives at its start input 218b the start pulse $I_S$ generated by the start circuit 204. The start-stop logic 218 further comprises a signal input 218c connected to the output of a frequency doubler 220 which at its input receives the square-wave signal $R_S$ with the frequency $f_M$ furnished by the transmission frequency generator 18. The frequency doubler supplies a square-wave signal $S_R$ with double the frequency $2 \cdot f_M$ to the signal input 218c of the start-stop logic 218.

The start-stop logic 218 comprises a signal output 218d connected to the counting input of a counter 222. It is configured so that it is opened by a start signal supplied to its start input 218b so that it allows the square-wave signal $S_R$ supplied to its signal input 218c to pass to its signal output 218d and thus to the counter 222, and that it is blocked by a stop signal $S_S$ applied by the output of the threshold value switch 216 to the stop input 218a so that the further transmission of the square-wave signal $S_R$ to the counter 222 is prevented.

The stage outputs of the counter 222 are connected to corresponding inputs of the evaluating circuit 32. The counter 222 counts in each case the square-wave pulses of the square-wave signal $S_R$ occurring between a start signal and a stop signal and supplies to the evaluating circuit 32 the count indicating the number of pulses counted.

The functioning of the arrangement of FIG. 17 will be explained with the aid of the diagrams of FIG. 18.

In FIG. 18 diagram A shows the transmission AC voltage $U_S$ furnished by the transmission frequency generator 18 and diagram B the corresponding square-wave voltage $R_S$ with the frequency $f_M$. Diagram C shows the square-wave voltage $S_R$ with the double frequency $2 \cdot f_M$ furnished by the frequency doubler 220. In diagram D the trigger pulse $I_A$ is shown which is supplied to the trigger input 204a of the start circuit 204 and can have any random time position relatively to the square-wave signal $R_S$. Diagram E shows the start pulse $I_S$ generated by the start circuit 204 which starts exactly in phase with a rising edge of the square-wave signal $R_S$ and is supplied both to the trigger input of the pulse generator 202 and to the start input 218b of the start-stop circuit 218. Due to the triggering by the start pulse $I_S$ the pulse generator 202 generates the single pulse $I_D$ of duration $T_D$ illustrated in diagram F (for clarity not drawn true to scale).

When the changeover switch 200 assumes the position illustrated in FIG. 17 and the directional changeover switch 16 is also set to the position 1 illustrated in FIG. 17 the single pulse $I_D$ is supplied to the ultrasonic transducer 12. Since a single pulse has beneath a limit frequency inversely proportional to its pulse duration a continuous frequency spectrum, the ultrasonic transducer 12 is stimulated by the single pulse $I_D$ applied to natural resonant oscillations at natural resonant frequencies which are contained in the frequency spectrum of the single pulse $I_D$. The ultrasonic transducer 12 thus generates a short ultrasonic wave train of the type illustrated in diagram G. This ultrasonic wave train runs through the medium flowing in the measuring tube to the receiving transducer 14 at which it arrives after a travel time $T_L$. The incoming wave train also stimulates the receiving transducer 14 to natural resonant oscillations so that it furnishes a reception AC voltage $U_E$ in the form of the wave train illustrated in diagram H which is supplied to the pulse receiving circuit 210.

In the pulse receiving circuit 210 the reception AC voltage $U_E$ is first amplified in the input amplifier 212, preferably with low-pass filtering, and then subjected by the rectifier circuit 214 to a full-wave rectification, resulting in the wave train $U_E'$ illustrated in diagram I which is applied to the input of the threshold value switch 216. The output signal of the threshold value switch 216 changes from a low signal value to a high signal value when the amplitude of its input signal exceeds for the first time a predetermined threshold value which is set very low. As a result, the stop signal $S_S$ illustrated in diagram J is obtained and is applied to the stop input 218a of the start-stop circuit 218.

Diagram K of FIG. 18 shows the pulse sequence which is transferred from the output 218d of the start-stop logic 218 to the counting input of the counter 222. Said pulse sequence starts in phase with the rising edge of the start pulse $I_S$ and also in phase with the rising edge of the square-wave signal $S_R$ as well as with a zero passage of the transmitting AC voltage $U_S$. The counter 222 now counts the number K of the pulses which are transmitted until the stop signal $S_S$ jumps up, i.e. during the travel time $T_L$. Due to the frequency doubling this number k is twice as great as the number m of the periods of the square-wave signal $R_S$ generated in the same interval of time by the transmission frequency generator 18 and thus also of the transmission AC voltage $U_S$. If instead of the single pulse $I_D$ the transmission AC voltage $U_S$ had been applied to the transmitting transducer 12, m periods of the transmission AC voltage $U_S$ would have travelled during the travel time $T_L$ from the transmitting transducer to the receiving transducer so that m whole wavelengths of the ultrasonic wave would have been present in the measuring tube between the two transducers. This is directly apparent from diagram A of FIG. 18 where m periods of the transmission AC voltage $U_S$ are present in the time interval $T_L$. The count k reached on stopping the counting operation thus corresponds to twice the number of whole wavelengths or to the number of half wavelengths in the measuring tube and the desired number m of the whole wavelengths is obtained directly from the count k in accordance with the equation $$m = int(k/2) \tag{30}$$

The determination of the number k of the half wavelengths by counting with twice the frequency $2 \cdot f_M$ has the advantage that the determination of the number m of the whole wavelengths can be checked by means of the phase measurement additionally carried out. This makes it possible to detect any error of half a wavelength in the determination of the number of the whole wavelengths and correct it. Thus, the transitions from m to m+1 or m−1 whole wavelengths involve no problems.

For the correct determination of the number m of the whole wavelengths the arrival of the acoustic wave train at the receiving transducer must be detected as rapidly as possible in a manner which can be reproduced as exactly as possible. This is the purpose of the full-wave rectification in the rectifier circuit 214. The signal $U_E'$ of the diagram I obtained by the full-wave rectification has a fundamental oscillation of twice the frequency of the original reception signal $U_E$ of diagram H so that exceeding of the response value of the threshold value switch 216 can be detected correspondingly earlier.

If the ultrasonic transducers are of the type illustrated in FIG. 15 with annular piezoelectric transducers there is a further advantageous possibility of avoiding errors in the determination of the number m of whole wavelengths in the measuring tube. As explained above, the annular piezoelectric transducers for the phase measurement are preferably operated with the radial resonance frequency. For determining the number m of the whole wavelengths in the measuring tube it has however been found advantageous to excite the transmitting transducer by the single pulse in such a manner that it oscillates not only at the radial resonant frequency but also at the longitudinal resonant frequency which is about three times as high as the radial resonant frequency. This can be achieved by suitable dimensioning of the duration $T_D$ of the single pulse by making the latter so short that the limit frequency of its frequency spectrum lies above the longitudinal resonant frequency. When the annular piezoelectric transducer is stimulated by such a short single pulse, at the start of the oscillation firstly the longitudinal resonance is predominant and then subsequently the radial resonance. Due to the higher longitudinal resonant frequency at the start of the wave train the pulse transmission has steeper edges so that the danger of measurement errors is still further reduced.

FIG. 19 illustrates the overall block circuit diagram of a flow rate measuring arrangement which contains both the circuit section for the exact phase measurement and the circuit section for the determination of the number m of the whole wavelengths in the measuring tube. The circuit section for the exact phase measurement corresponds to the example of embodiment of FIG. 9 with a differential frequency generator 80. The circuit section for the determination of the number m of the whole wavelengths in the measuring tube corresponds to the example of embodiment of FIG. 17. The circuit blocks in FIG. 19 corresponding to those of FIG. 9 or FIG. 17 are denoted by the same reference numerals as therein and will not be described again. For greater clarity of the block circuit diagram some connections have not been completely drawn but replaced by arrows indicating the destination or origin of the respective signals.

Furthermore, the case assumed in FIG. 19 is the one in which the evaluating circuit 32 is formed by a microcomputer ($\mu C$) which also furnishes the control signals necessary for the execution of the measuring method. For clarity the connections for the transmission of signals from and to the microcomputer have likewise not been shown but replaced by arrows with the designation "$\mu C$".

In the flow rate measuring arrangement of FIG. 19 two additional steps have also been taken which have so far not been mentioned.

The first step resides in that in the receiving section of the circuit an amplitude monitoring circuit 224 is provided to which the receiving AC voltage $U_E$ coming from the directional changeover switch 16 is supplied. A further input of the amplitude monitoring circuit 224 receives the square-wave voltage $Q_E$ from the output of the reception signal processing circuit 20. The amplitude monitoring circuit 224 checks whether the amplitude of the reception AC voltage $U_E$ is large enough to permit correct evaluation. The square-wave voltage $Q_E$ is supplied for controlling the amplitude monitoring. If the amplitude of the receiving AC voltage $U_E$ drops below a predetermined value the amplitude monitoring circuit 224 delivers a signal to the microcomputer 32 which thereupon issues a warning.

The second step resides in that between the transmission signal processing circuit 22 and the phase detector 24 an inverter circuit 226 is inserted which is controllable by a signal furnished by the microcomputer 32 in such a manner that it either allows the square-wave voltage $Q_S$ to pass unchanged or inverts it. The inverter circuit 226 permits measurement of very small residual phase angles lying in the vicinity of 0°. With such small residual phase angles the duration $T_I$ of the measuring pulses $I_M$ become so small that it can no longer be determined with the steps described above. When the microcomputer 32 detects this state it initiates inversion of the square-wave voltage $Q_S$. This corresponds to a phase angular shift through 180° and as a result the residual phase angle becomes 180° greater and accordingly the duration $T_I$ of the measuring pulses $1/(2 \cdot f_M)$ longer.

This effect will be apparent from the diagrams of FIG. 20. Diagrams A, B and C of FIG. 20 show the square-wave voltage $Q_S$ and $Q_E$ and the measuring pulses $I_M$ corresponding to the illustration in the diagrams B, C, D of FIGS. 2 and 3 but for a very small residual phase angle so that the time interval $\Delta t$ and accordingly the duration $T_I$ of the measuring pulses $I_M$ is very small. The diagrams D, E and F of FIG. 20 show the same signals for the case where the square-wave voltage $Q_S$ is inverted. It is apparent that in this case the measuring pulses $I_M$ have a considerably greater duration $T_I$ permitting measurement without any problems.

Between the reception signal processing circuit 20 and the phase detector 24 a delay circuit 228 is inserted which compensates the delay caused by the inverter circuit 226 so that the signals $Q_S$ and $Q_E$ have at the inputs of the phase detector 24 the same relative phase position as at the outputs of the processing circuits 20 and 22. Of course, the position of the circuits 226 and 228 may be interchanged so that instead of the signal $Q_S$ the signal $Q_E$ is inverted.

With the aid of the overall block circuit diagram the complete sequence of a measuring operation under the control of the microcomputer 32 can be explained. A complete measuring operation takes place in the following phases:

1. Determination of the number of whole wavelengths a) The microcomputer 32 brings the directional changeover switch 16 and the changeover switch 200 into the respective position 1 and sends a trigger pulse IA to the start circuit 204.

b) Synchronously with a rising edge of the square-wave voltage $R_S$ the start circuit 204 sends a start pulse $I_S$ to the pulse generator 202 so that the latter emits a single pulse $I_D$ which via the switches 200 and 16 is applied to the ultrasonic transducer 12. Simultaneously, the start pulse $I_S$ opens the start-stop logic 218 so that the counter 222 begins to count the pulses of the square-wave signal $S_R$.

c) When the amplitude of the amplified and rectified receiving signal $U_E'$ reaches the response value of the threshold value switch 216 the start-stop logic 218 is blocked by the stop signal $S_S$ so that the pulse counting in the counter 222 is terminated. The count reached is transferred to the microcomputer 32 which calculates therefrom the number m of the whole wavelengths in the measuring tube. Thereafter the counter 222 is reset to zero.

2. Measurement of the residual phase angle in the flow direction a) The microcomputer 32 brings the changeover switch 200 into the position 2 but leaves the direction changeover switch 16 in the position 1 so that the transmission AC voltage $U_S$ is applied to the ultrasonic transducer 12.

After expiry of a waiting time, after which the oscillations of the transmitting transducer 12 have become stable, the first residual phase measurement is made by pulse counting during a measuring time interval of duration $T_1$ in the counter 30, whereupon the count reached is transferred to the microcomputer 32 and the counter 30 reset to zero.

c) The microcomputer 32 checks whether the duration $T_1$ of the measuring pulses $I_M$ suffices for a proper calculation or whether an inversion is required. If required, the inverting circuit 226 is reversed.

d) The measurement of the pulse duration $T_I$ of the measuring pulses $I_M$ by pulse counting in the counter 30 is repeated in n successive measuring time intervals in which an angular phase rotation of the start phase $\phi_S$ through $2\pi$ takes place. After each measuring time interval the count of the counter 30 is transferred to the microcomputer 32 and the counter 30 reset to zero.

e) After expiry of the n measuring time intervals the microcomputer 32 determines from the n counts obtained the mean residual phase angle $\phi_{R1}$ by averaging.

3. Measurement of the residual phase angle against the flow direction a) The microcomputer 32 brings the directional changeover switch 16 into the position 2 and leaves the changeover switch 200 in the position 2 so that the transmission AC voltage $U_S$ is applied to the ultrasonic transducer 14.

b) After expiry of a waiting time, after which the oscillations of the transmitting transducer 14 have become stable, the measurement of the pulse duration $T_I$ of the measuring pulses $I_M$ by pulse counting in the counter 30 is repeated in n consecutive measuring time intervals in which an angular phase rotation of the start phase $\phi_S$ through $2\pi$ takes place. After each measuring time interval the count of the counter 30 is transferred to the microcomputer 32 and the counter 30 reset to zero.

c) After expiry of the n measuring time intervals the microcomputer 32 determines from the n counts obtained the mean residual phase angle $\phi_{R2}$ by averaging.

4. Calculation of the flow velocity

The microcomputer 32 calculates from the measured values m, $\phi_{R1}$ and $\phi_{R2}$ obtained and from the predetermined values for $f_M$ and $L_M$ the flow velocity $V_M$ in accordance with the equation (9) and from the latter the volume flow rate by multiplication by the flow cross-sectional area. The results are optically displayed in suitable manner and/or converted to signals suitable for data transmission, for example to a frequency-proportional signal.

A complete measuring operation has then been performed. It should be pointed out that the determination of the number m of whole wavelengths need not necessarily take place at the beginning of each measuring operation because said number changes only slowly, if at all. In addition, a gradual change of the number m of whole wavelengths is also apparent from the progressive change of the measured residual phase angle. It would therefore suffice to repeat the measurement of the number m of whole wavelengths in relatively large intervals of time, for example every 10 seconds.

We claim:

1. Method for flow rate measurement by means of ultrasonic waves which are propagated in a medium flowing through a measuring tube (10) between two ultrasonic transducers (12, 14) which are arranged spaced a defined distance apart from each other and of which the one operates as transmitting transducer converting an electrical transmission signal ($U_S$) to an ultrasonic wave of the same frequency ($f_M$) whilst the other operates as receiving transducer converting the incoming ultrasonic wave to an electrical reception signal ($U_E$) of the same frequency, the phase shift between the transmission signal ($U_S$) and the reception signal ($U_E$) being measured to determine the flow rate, the method comprising the steps of generating a counting frequency signal ($I_C$) with a counting frequency ($f_C$) substantially greater than the measuring frequency ($f_M$), counting the periods of the counting frequency signal ($I_C$) in measuring time intervals ($T_I$) corresponding to the phase shift between the transmission signal ($U_S$) and the reception signal ($U_E$), varying a start phase ($\phi_S$) which the counting frequency signal ($I_C$) has at the beginning of each counting operation with respect to the measuring time interval ($T_I$) from measuring time interval to measuring time interval in a measuring cycle ($T_R$) including a plurality of consecutive measuring time intervals ($T_I$), and evaluating the counts obtained in the course of the measuring cycle ($T_R$) to form a measured value with increased measurement resolution.

2. Method according to claim 1, characterized in that the start phase ($\phi_S$) of the counting frequency signal ($I_C$) is varied in the course of the measuring cycle ($T_R$) by $2\pi$.

3. Method according to claim 1 or 2, characterized in that the measuring frequency ($f_M$) is derived from the counting frequency ($f_C$) by frequency division and that in each measuring cycle ($T_r$) a phase shift ($\phi_M$) varying from period to period of the measuring frequency ($f_M$) is imparted to the measuring frequency ($f_M$) with respect to the counting frequency ($f_C$).

4. Method according to claim 3, characterized in that the phase shift ($\phi_M$) imparted to the measuring frequency ($f_M$) becomes continuously greater in the course of the measuring cycle ($T_R$).

5. Method according to claim 4, characterized in that the phase shift ($\phi_M$) imparted to the measuring frequency ($f_M$) in each period of the measuring frequency is varied in dependence upon preceding measurement results for the purpose of a successive approximation.

6. Method according to claim 1 or 2, characterized in that the measuring frequency ($f_M$) is derived by frequency division from a frequency ($f_C$) which differs by a predetermined differential frequency ($\Delta f$) from the counting frequency ($f_C$).

7. Method according to claim 6, characterized in that the differential frequency ($\Delta f$) is equal to the measuring frequency ($f_M$) divided by the number (n) of the measuring time intervals ($T_I$) per measuring cycle ($T_R$).

8. Method according to claim 1, characterized in that a frequency modulation with predetermined frequency swing ($f_h$) about a middle frequency ($f_{C0}$) is imparted to the counting frequency ($f_C$).

9. Method according to claim 8, characterized in that the frequency modulation of the counting frequency ($f_C$) takes place in accordance with a periodic function which varies symmetrically to the middle frequency ($f_{C0}$) and the period duration of which is equal to the duration of a measuring cycle ($T_R$).

10. Method according to claim 9, characterized in that the periodic function is a sinusoidal function.

11. Method according to claim 9, characterized in that the periodic function is a sawtooth function.

12. Method according to claim 9, characterized in that the periodic function is a periodic pseudo random function.

13. Method according to claim 12, characterized in that the periodic pseudo random function is reset to the same initial state prior to the start of each measuring cycle ($T_R$).

14. Method according to claim 8, characterized in that the frequency modulation of the counting frequency ($f_C$) takes place in accordance with a noise function with statistically equal distribution.

15. Method according to claim 14, characterized in that the frequency spectrum of the noise function is subjected to a bandwidth limitation with an upper and lower limit frequency ($f_{Gmax}$, $f_{Gmin}$).

16. Method according to claim 15, characterized in that the upper limit frequency ($f_{Gmax}$) is small compared with twice the reciprocal ($2/T_I$) of the duration of a measuring time interval ($T_I$) and that the lower limit frequency ($f_{Gmin}$) is large compared with the reciprocal ($1/T_R$) of the duration of a measuring cycle ($T_R$).

17. Method according to claim 1, characterized in that the counting frequency signal ($I_C$) is generated in each case only in the duration of the measuring time interval ($T_I$), that the phase position of the counting frequency signal ($I_C$) is stored at the end of each measuring time interval and that the generation of the counting frequency signal ($I_C$) at the start of each following measuring time interval is continued with the stored phase position.

18. Method according to claim 17, characterized in that the counting frequency signal ($I_C$) is derived from a delta voltage ($U_D$) generated in each case only in the duration of each measuring time interval ($T_I$) and at the beginning of each measuring time interval continued from the signal level reached at the end of the preceding measuring time interval.

19. Method according to claim 1, characterized in that on detection of a duration of the measuring time intervals ($T_I$) too small for correct measurement of the phase shift an additional phase shift through 180° is imparted to one of the two signals ($U_S$, $U_E$) having a relative phase shift.

20. Method according to claim 19, characterized in that the phase shift between two square-wave signals ($Q_S$, $Q_E$) derived from the transmission signal ($U_S$) and the reception signal ($U_E$) is measured and that to obtain the additional phase shift through 180° one of the two square-wave signals ($Q_S$, $Q_E$) is inverted.

21. Method according to claim 1, characterized in that to determine whole wavelengths of the ultrasonic waves in the medium flowing through the measuring tube (10) between the two ultrasonic transducers (12, 14) the transmitting transducer is stimulated by a short pulse ($I_D$) to transmit a wave train and the periods of a signal ($S_R$) with the measuring frequency ($f_M$) or an integer multiple ($2 \cdot f_M$) of the measuring frequency are counted during the travel time ($T_L$) of the wave train from the transmitting transducer to the receiving transducer.

22. Method according to claim 1, characterized in that the amplitude of the reception signal ($U_E$) is monitored and on detection of an amplitude insufficient for proper evaluation a signal is sent to an evaluating circuit (32).

23. Arrangement for flow rate measurement by means of ultrasonic waves comprising a measuring tube (10) traversed by a medium, two ultrasonic transducers (12, 14) arranged on the measuring tube (10) at a definite distance ($L_M$) from each other, means for applying an electrical transmission signal ($U_S$) with a measuring frequency ($f_M$) to one of the two ultrasonic transducers which operates as transmitting transducer converting said electrical transmission signal ($U_S$) to an ultrasonic wave of the measuring frequency which is propagated in said medium while the other ultrasonic transducer operates as receiving transducer converting the ultrasonic wave to an electrical reception signal ($U_E$) of the measuring frequency, means for receiving the electrical reception signal ($U_E$) with the measuring frequency emitted by the other ultrasonic transducer, a counting frequency generator generating a counting frequency signal ($I_C$) with a counting frequency ($f_C$) substantially greater than the measuring frequency ($f_M$), a counter (30) counting the periods of the counting frequency signal ($I_C$) in measuring time intervals ($T_I$) which correspond to the phase shift between the transmission signal ($U_S$) and the reception signal ($U_E$), and an evaluating circuit (32) to which the count reached in each measuring time interval ($T_I$) is transferred, characterized by means which vary the start phase ($\phi_S$) which the counting frequency signal ($I_C$) has at the beginning of each counting operation with respect to the measuring time interval ($T_I$) from measuring time interval to measuring time interval in a measuring cycle ($T_R$) including a plurality of consecutive measuring time intervals ($T_I$).

24. Arrangement according to claim 23, characterized in that to the output of the counting frequency generator (28) a frequency divider (34) is connected of which the division factor (N) corresponds to the ratio between the counting frequency ($f_C$) and the measuring frequency ($f_M$), that the frequency divider (34) is followed by a controllable phase shifter (36) which imparts a phase shift defined by a phase control signal ($U_R$) to the output signal of the frequency divider (34), and that the output signal of the controllable phase shifter (36) is employed for the electrical transmission signal ($U_S$).

25. Arrangement according to claim 24, characterized in that the phase control signal ($U_R$) is a ramp signal varying linearly in the course of each measuring cycle.

26. Arrangement according to claim 24, characterized by a digital-analog converter (70) which converts digital code groups to the phase control signal ($U_R$).

27. Arrangement according to any one of claims 24 to 26, characterized in that the controllable phase shifter (36) is formed by a PLL circuit.

28. Arrangement according to claim 23, characterized in that the counting frequency generator furnishes at a first output (80a) the counting frequency signal ($I_C$) and at a second output a signal having a frequency ($f_C'$) which differs from the counting frequency ($f_C$) by a predetermined differential frequency ($\Delta_f$) and that to the second output (80b) of the counting frequency generator (80) a frequency divider (34) is connected and the output signal ($R_S$) thereof is used to generate the electrical transmission signal ($U_S$).

29. Arrangement according to claim 23, characterized in that the counting frequency generator includes a frequency modulator (100) and a modulation signal generator (112) and that the counting frequency signal ($I_C$) is formed from the output signal of the frequency modulator (100) frequency-modulated by the modulation signal.

30. Arrangement according to claim 29, characterized in that the frequency modulator (100) is formed by a PLL circuit which includes a voltage-controlled oscillator (116) on the control signal of which the modulation signal furnished by the modulation signal generator (112) is superimposed and which at the output furnishes a signal with the frequency-modulated counting frequency ($f_C$).

31. Arrangement according to claim 29 or 30, characterized in that the modulation signal generator (112) is a noise generator.

32. Arrangement according to claim 29 or 30, characterized in that modulation signal generator (112) is a pseudo random generator.

33. Arrangement according to claim 29 or 30, characterized in that the modulation signal generator (112) is followed by a bandpass (114).

34. Arrangement according to claim 23, characterized in that the counting frequency generator is stopped at the end of each measuring time interval ($T_I$) and restarted again at the beginning of the respective following measuring time interval ($T_I$) with the phase position of the counting frequency reached on the stopping.

35. Arrangement according to claim 34, characterized in that the counting frequency generator includes a delta generator (124) which in the duration of the measuring time interval ($T_I$) generates a delta voltage ($U_D$) with the counting frequency ($f_C$) and at the start of each measuring time interval continues the generation of the delta voltage ($U_D$) with the signal level reached at the end of the preceding measuring time interval.

36. Arrangement according to claim 35, characterized in that the delta generator (124) is followed by a pulse shaper (126) which transforms the output voltage ($U_D$) of the delta generator (124) to counting pulses ($I_C$) in phase therewith.

37. Arrangement according to 23, characterized by a pulse generator (202) which for the determination of the number (m) of whole wavelengths of the ultrasonic wave in the measuring tube (10) applies a short single pulse ($I_D$) to one of the two ultrasonic transducers (12, 14) so that the latter is stimulated to transmit a short wave train, a counter (222) which is set in operation on application of the single pulse ($I_D$) for counting a counting signal ($S_R$) with the transmission frequency ($f_M$) or an integer multiple ($2 \cdot f_M$) of the transmission frequency, and by a pulse-receiving circuit (210) which is connected to the other ultrasonic transducer and stops the counter (222) on arrival of the short wave train at the other ultrasonic transducer.

38. Arrangement according to claim 37, characterized in that the pulse-receiving circuit (210) includes in succession an input amplifier (212), a rectifier circuit (214) and a threshold value switch (216).

39. Arrangement according to claim 37 or 38, characterized in that the counting signal ($S_R$) is supplied to the counter (222) via a start-stop logic (218) which is opened by a start signal ($I_S$) initiating the generation of the short single pulse ($I_D$) and is blocked by a stop signal ($S_S$) emitted by the output of the pulse-receiving circuit (210).

40. Arrangement according to claim 37 or 38, characterized by a frequency doubler (220) which receives a square-wave signal ($R_S$) with the transmission frequency ($f_M$) and emits the counting signal ($S_R$) with twice the frequency ($2 \cdot f_M$).

41. Arrangement according to claim 23, characterized by signal processing circuits (20, 22) which convert the reception signal ($U_E$) and the transmission signal ($U_S$) to square-wave voltages ($Q_E$, $Q_S$) in phase therewith and by a phase detector (24) which receives the square-wave voltages ($Q_E$, $Q_S$) and furnishes measuring pulses ($I_M$) having a duration which corresponds to the phase shift between its input signals and governs the duration of the measuring time intervals ($T_I$).

42. Arrangement according to claim 41, characterized in that between the output of one of the two signal processing circuits (20, 22) and the associated input of the phase detector (24) an inverting circuit (226) is inserted which is actuated by a control signal furnished by the evaluating circuit (32) for inversion of the square-wave voltage ($Q_S$ or $Q_E$) supplied thereto when the evaluating circuit (32) detects that the duration ($T_I$) of the measuring pulses ($I_M$) furnished by the phase detector (24) lies beneath a predetermined value.

43. Arrangement according to claim 23, characterized by an amplitude monitoring circuit (224) which receives the reception AC voltage and supplies a signal to the evaluating circuit (32) when the amplitude of the reception AC voltage lies beneath a predetermined value.

44. Arrangement according to claim 43, characterized in that each ultrasonic transducer (12, 14) is formed by an annular piezoelectric transducer (130) which is installed coaxially to the measuring tube (10) and which for measuring the phase shift is stimulated by a measuring frequency ($f_M$) equal to its radial resonant frequency.

45. Arrangement according to claim 44, characterized in that the radial resonant frequency of the annular piezoelectric transducer (130) is so chosen that the wavelength of the ultrasonic wave propagated in the medium is greater than 1.6 times the internal diameter of the measuring tube (10).

46. Arrangement according to claim 44 or 45, characterized in that the acoustic characteristic impedance of the measuring tube (10) is substantially greater than the acoustic characteristic impedance of the medium flowing therein.

47. Arrangement according to claim 44, characterized in that the annular piezoelectric transducer (130) for determining the number of whole wavelengths in the measuring tube (10) is stimulated by a short single pulse ($I_D$) to oscillations at its longitudinal resonant frequency.

48. Arrangement according to claim 44, characterized in that the inner surface of the annular piezoelectric transducer (130) is covered with a protective layer (138) resistant to aggressive media.

49. Arrangement according to claim 48, characterized in that between the annular piezoelectric transducer (130) and the adjacent tube sections seals (150, 152) are inserted having an acoustic characteristic impedance which is substantially smaller than the acoustic characteristic impedance of the tube sections.

50. Arrangement according to claim 44, characterized in that on both sides of the measuring tube (10) attenuation tubes (160) are arranged of which the inner side is lined with a nonporous damping material (164).

* * * * *